(12) United States Patent
Shoji

(10) Patent No.: US 7,184,808 B2
(45) Date of Patent: Feb. 27, 2007

(54) PORTABLE WIRELESS COMMUNICATION APPARATUS

(75) Inventor: Hideaki Shoji, Chiba (JP)

(73) Assignee: Sony Ericsson Mobile Communication Japan, Inc., Tokyo (JP)

(*) Notice: Subject to any disclaimer, the term of this patent is extended or adjusted under 35 U.S.C. 154(b) by 295 days.

(21) Appl. No.: 10/714,787

(22) Filed: Nov. 17, 2003

(65) Prior Publication Data

US 2004/0106428 A1 Jun. 3, 2004

(30) Foreign Application Priority Data

Nov. 19, 2002 (JP) .......................... P2002-335682

(51) Int. Cl.
*H04M 1/00* (2006.01)
(52) U.S. Cl. ............................. 455/575.7; 455/575.5; 343/702
(58) Field of Classification Search ........... 343/702 M, 343/702, 846, 906, 904; 455/550.1, 575.3, 455/575.5, 575.7
See application file for complete search history.

(56) References Cited

U.S. PATENT DOCUMENTS 4,641,366 A * 2/1987 Yokoyama et al. ........... 455/73
6,959,210 B2 * 10/2005 Nakamura ................ 455/575.3
2001/0052876 A1 * 12/2001 Tanizaki et al. ..... 343/700 MS
2003/0087610 A1 * 5/2003 Ono ............................. 455/90
2003/0092420 A1 * 5/2003 Sugimoto et al. ........... 455/333
2003/0184485 A1 * 10/2003 Jiang et al. ................. 343/767

FOREIGN PATENT DOCUMENTS

| EP | 1 309 156 | 5/2003 |
| JP | 10 308618 | 11/1998 |
| JP | 2001 156898 | 6/2001 |
| WO | WO 02 03665 | 1/2002 |

* cited by examiner

*Primary Examiner*—Edward F. Urban
*Assistant Examiner*—Nhan T. Le
(74) *Attorney, Agent, or Firm*—Frommer Lawrence & Haug LLP; William S. Frommer; Paul A. Levy

(57) ABSTRACT

A portable wireless communication apparatus capable of attaining a broadband antenna characteristic with a simple structure is that incorporated in a mobile phone having first and second casings foldable through a hinge part and comprises first and second ground conductors respectively incorporated in the first and second casings, and a flexible printed circuit board for connecting the first and second ground conductors. The flexible printed circuit board is of a structure that signal lines for electrically connecting circuits respectively on the first and second ground conductors that are spaced at a prescribed interval are integral, through an insulator, with a conductor line for supplying a high frequency signal to either first or second ground conductor to electrically connect the first and second ground conductors through the conductor line. Then, feeding is effected with an end of a feeder connected to the conductor line.

19 Claims, 22 Drawing Sheets

PORTABLE WIRELESS COMMUNICATION APPARATUS

CROSS REFERENCES TO RELATED APPLICATIONS

The present document is based on Japanese Priority Document JP 2002-335682, filed in the Japanese Patent Office on Nov. 19, 2002, the entire contents of which being incorporated herein by reference.

BACKGROUND OF THE INVENTION

1. Field of the Invention

The present invention relates to a portable wireless communication apparatus, and more particularly, to a portable wireless communication apparatus having an antenna being capable of attaining a broadband antenna characteristic with a simple structure.

2. Description of the Related Art

In general, to incorporate an antenna in a folding mobile phone, for instance, a number of measures have been taken to meet form-factor reductions of the mobile phone and/or attain an increased antenna characteristic so that each circuit part incorporated in the mobile phone has no effect on the antenna characteristic (See Patent Documents 1, 2 and 3, for instance).

A folding mobile phone as disclosed in the Patent Documents 1 has two casings, and components required for the mobile phone are all housed in one casing. The other casing is covered with a conductive film having a window. The folding mobile phone is configured so that the above conductive film and a substrate in the casing with the components housed are respectively used as an antenna element and a ground conductor to configure a mono-pole antenna when the mobile phone is unfolded, or to operate as a patch antenna when the mobile phone is folded over.

A portable wireless communication apparatus as disclosed in the Patent Document 2 is that having an antenna mounted to a casing bend part. The portable wireless communication apparatus is configured so that a connection cable extending over both two casings has at an intermediate portion a resistance and/or an inductor to ensure that cutoff of upper and lower circuits respectively incorporated in the two casings is achieved in a high-frequency bandwidth.

A mobile phone as disclosed in the Patent Document 3 has two casings, and one casing incorporates a plate-shaped element operating as an antenna. The other casing incorporates a transmission/reception circuit that is connected to the above element through a feeder. The mobile phone is configured so that the plate-shaped element has a plurality of holes for mounting components in an embedded state to ensure that components or the like on a circuit substrate have no effect on the plate-shaped element and that the plate-shaped element operates as a mono-pole antenna when the mobile phone is unfolded.

[Patent Document 1]
Japanese Patent Laid-open No. 2000-216611 (Page 3 and FIGS. 1 to 3)

[Patent Document 2]
Japanese Patent Laid-open No. Hei 9-270728 (Page 2 and FIGS. 3 and 4)

[Patent Document 3]
Japanese Patent Laid-open No. 2001-156898 (Pages 4 and 5 and FIG. 1)

In the folding mobile phone as disclosed in the Patent Document 1, the conductive film and the substrate in the casing with the components housed need to be cut off in a high frequency bandwidth to allow the conductive film and the substrate to operate as the mono-pole antenna.

However, when upper and lower substrates are connected together through a printed circuit board, the conductive film and the printed circuit board result in the same potential state. Thus, the folding mobile phone has a difficulty in attaining an increased antenna characteristic.

The portable wireless communication apparatus as disclosed in the above Patent Document 2 is cited as one of approaches to solving the above problems. However, this portable wireless communication apparatus is limited in cutoff-enable frequency bandwidth depending on the kind of components such as the resistance and the inductor. Thus, a system requiring a broadband frequency bandwidth is hard to effect cutoff in the whole frequency bandwidth. In addition, the above portable wireless communication apparatus has the disadvantage of causing delays in a transmission characteristic (time constant of a pulse signal) of a signal such as a control signal transmitted over the connection cable.

The mobile phone as disclosed in the above Patent Literature 3 is also cited as one of approaches to solving the above problems. However, in this portable phone, when the above components include those contributing to short-circuiting of ground faces of both the substrates through the connection cable, the antenna characteristic is sometimes degraded unless a sufficient distance from a plate-shaped antenna is kept.

Also, when this mobile phone has a larger hole in the conductive film considering a wavelength, the presence of this larger hole causes current mode variations (in other words, this larger hole operates as a slot antenna or a notch antenna), and thereby has an effect on the antenna characteristic. Further, it is feared that the above mobile phone causes capacitive coupling or short-circuiting between signal lines in the connection cable and the plate-shaped antenna depending on an available frequency bandwidth so that a high frequency current induced on the plate-shaped antenna conducts over the signal lines to exert an adverse effect on a wireless circuit. The above mobile phone also causes a thermal loss of the high frequency current depending on a terminal load of the signal lines, and this heat loss of the high frequency current is attributable to remarkable degradation of the antenna characteristic.

SUMMARY OF THE INVENTION

The present invention has been undertaken in view of the above problems, and is intended to provide a portable wireless communication apparatus having a broadband antenna characteristic attainable with a simple structure without depending on packaging conditions of circuit substrates and/or components incorporated in a mobile phone or the like, for instance.

A portable wireless communication apparatus according to the present invention comprises an antenna composed of two ground conductors, connection means for connecting these ground conductors together at a prescribed interval, and a feeder for feeding power to a part of the connection means. The connection means is configured so that signal lines for electrically connecting circuits respectively provided on the ground conductors together and a conductor line for supplying a high frequency signal to either ground conductor are integrated with each other through an insulator to electrically connect the ground conductors together through the conductor line. The portable wireless communication apparatus of the present invention further has a feed point on either ground conductor to feed power to a part of the connection means or to a ground conductor other than the ground conductor having the feed point.

The portable wireless communication apparatus of the present invention allows the conductor line integrated with the signal lines through the insulator to operate as a part of an antenna. Also, according to the portable wireless communication apparatus of the present invention, the insulator is adapted to electrical shielding between the signal lines and the conductor line, so that the conductor line has no effect on the signal lines.

BRIEF DESCRIPTION OF THE DRAWINGS

The features and advantages of the present invention will become more apparent in the following description of presently preferred embodiments of the invention taken in conjunction with the accompanying drawings, in which.

DETAILED DESCRIPTION OF THE PREFERRED EMBODIMENTS

The following embodiments are those as applications of a portable wireless communication apparatus according to the present invention to a mobile phone.

[First Embodiment]

Figure 1:
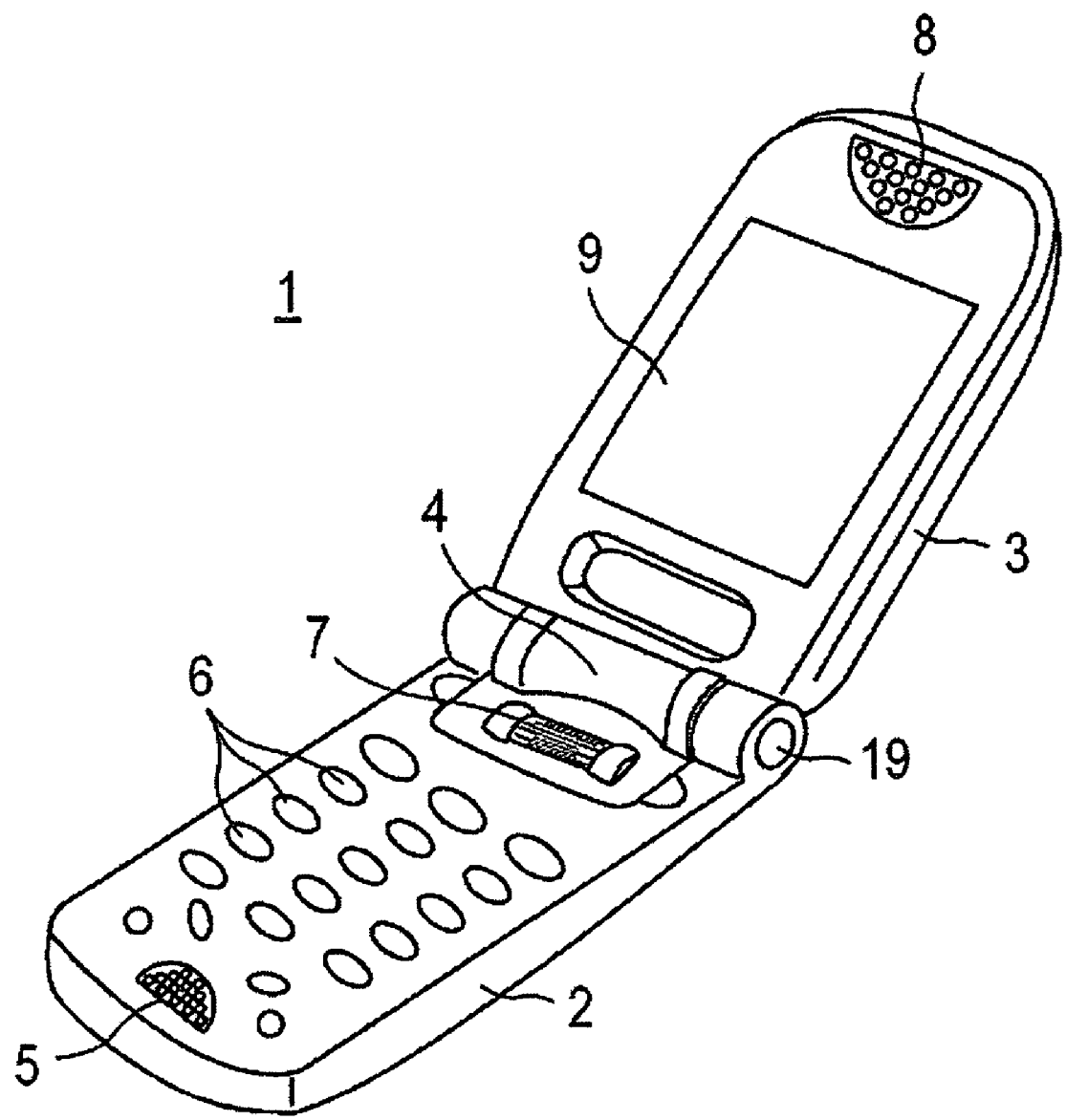
FIG. 1 is a perspective view showing an application of a portable wireless communication apparatus according to the present invention to a folding mobile phone.

As shown in FIG. 1, a mobile phone 1 of a first embodiment comprises a first casing 2 and a second casing 3. The first casing 2 and the second casing 3 are connected together in a pivotally movable manner through a hinge part 4 to be switched between a two-folded state and an unfolded state. Thus, the mobile phone 1 of the first embodiment is a so-called folding mobile phone.

The first casing 2 has various kinds of circuit parts such as a RF circuit and a transmission/reception circuit required as components of a mobile phone, in addition to a microphone 5, various operation buttons 6 and a jog dial 7 or the like. Likewise, the second casing 3 has various kinds of circuit parts such as a display drive circuit, in addition to a receiver 8 and an image display part 9 or the like. Also, the first casing 2 and the second casing 3 have therein an antenna that configures the portable wireless communication apparatus.

Figure 2:
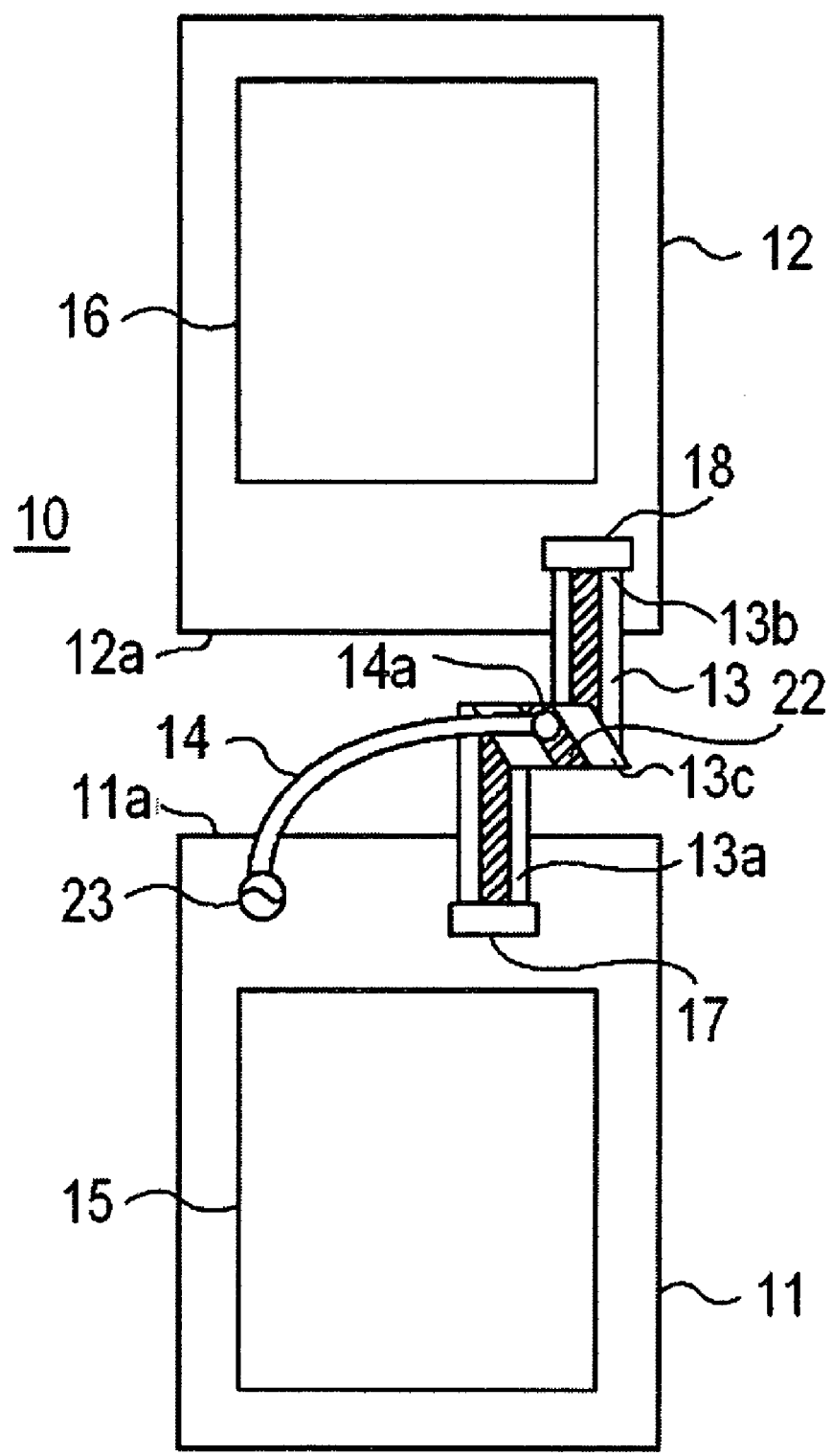
FIG. 2 is a plan view showing an antenna that configures a portable wireless communication apparatus of a first embodiment.
Figure 3:
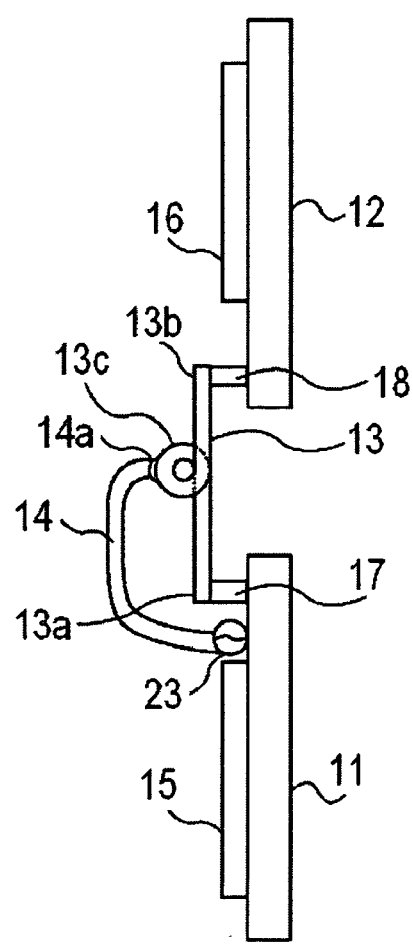
FIG. 3 is a side view showing the antenna that configures the portable wireless communication apparatus of the first embodiment.

As shown in FIGS. 2 and 3, an antenna 10 has a first ground conductor 11, a second ground conductor 12, a connection means such as a flexible printed circuit board 13 that connects the first conductor 11 and the second conductor 12 together and operates as a part of the antenna, and a feeder 14 connected to a part of the flexible printed circuit board 13 to feed power thereto.

The first casing 2 having various operation buttons 6 or the like incorporates the first ground conductor 11. As shown in FIG. 2, the first ground conductor 11 is in the form of a rectangular member having an approximately rectangular shape in plan. The first ground conductor 11 has thereon various kinds of circuit parts such as a wireless circuit part 15 composed of the RF circuit and the transmission/reception circuit or the like, for instance, and others.

The second casing 3 having the image display part 9 or the like incorporates the second ground conductor 12. As shown in FIG. 2, the second ground conductor 12 is also in the form of a rectangular member having an approximately rectangular shape in plan, similarly to the first ground conductor 11. The second ground conductor 12 has thereon various kinds of circuit parts such as a display drive circuit part 16 for controlling drive of the image display part 9 such as a liquid crystal display, for instance, and others.

The flexible printed circuit board 13 is connected to the first ground conductor 11 and the second ground conductor 12 spaced at a prescribed interval to make connection between the first ground conductor 11 and the second ground conductor 12. One end 13a of the flexible printed circuit board 13 is connected to a first connector 17 mounted to the vicinity of one edge 11a of the first ground conductor 11 at the side opposite to the second ground conductor 12. The other end 13b of the flexible printed circuit board 13 is connected to a second connector 18 mounted to the vicinity of one edge 12a of the second ground conductor 12 at the side opposite to the first ground conductor 11. An approximately central part 13c of the flexible printed circuit board 13 is in a loop-like rounded form such as to be wound around a pivotal axis 19, which configures the hinge part 4, with a certain degree of slackening kept.

Figure 4:
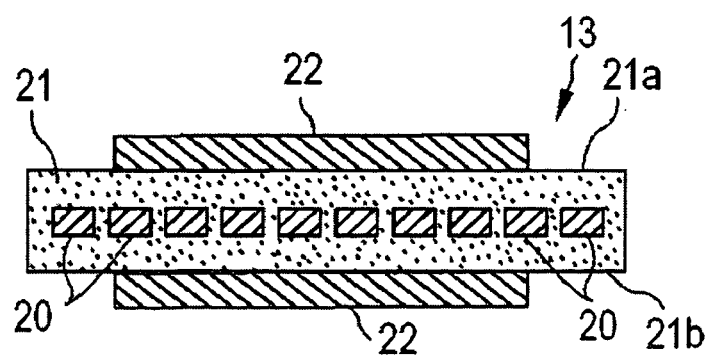
FIG. 4 is a fragmentary enlarged cross-sectional view showing a flexible printed circuit board used for the antenna that configures the portable wireless communication apparatus of the first embodiment.

As shown in FIG. 4, the flexible printed circuit board 13 is a flexible flat cable configured so that signal lines 20 for electrically connecting the various kinds of circuit parts such as the wireless circuit part 15 and others on the first ground conductor 11 and the various kinds of circuit parts such as the display drive circuit part 16 and others on the second ground conductor 12 together are enclosed with an insulator 21.

The signal lines 20 are to electrically connect the circuit parts respectively on the first ground conductor 11 and the second ground conductor 12 through the first connector 17 and the second connector 18. For instance, one signal line 20 is to transfer a drive control signal from a power supply circuit part on the first ground conductor 11 to the display drive circuit part 16 on the second ground conductor 12.

The flexible printed circuit board 13 also has a conductor line 22 (portion shown by slanted lines in FIG. 2) to allow the second ground conductor 12 to operate as a part of the antenna by supplying a high frequency signal thereto. The conductor line 22 is in the form of a long strip-like pattern (plated layer) obtained by plating, with a conductive metal material, the insulator 21 having a thickness enough to prevent the conductor line 22 from having an effect on the signal lines 20. Then, the conductor line 22 is connected (grounded) to the first ground conductor 11 and the second ground conductor 12 through the first connector 17 and the second connector 18. According to the first embodiment, there is provided the conductor line 22 on each of upper and lower faces 21a and 21b of the insulator 21 with the signal lines 20 between.

It is noted that the conductor line 22 preferably needs to be as thick as the flexible printed circuit board 13 may keep showing its flexibility. It is also preferable that the conductor line 22 is covered with an insulating protection film to protect the conductor line 22, at need.

The feeder 14 extends over both the first ground conductor 11 and the flexible printed circuit board 13, as shown in FIGS. 2 and 3. The feed point 23 is mounted to the vicinity of one edge 11a of the first ground conductor 11 at the side opposite to the second ground conductor 12. According to the first embodiment, there is provided the feed point 23 in the vicinity of one corner part at the side opposite to the other corner part having the first connector 17.

Then, one end 14a of the feeder 14 is electrically connected to a part of the flexible printed circuit board 13. Specifically, one end 14a of the feeder 14 is connected to the conductor line 22 integrated with the signal lines 20 of the flexible printed circuit board 13. Thus, a high frequency signal (RF signal) from the wireless circuit part 15 to the antenna 10 is supplied from the feeder 14 to the second ground conductor 12 through the conductor line 22. As described above, the portable wireless communication apparatus of the first embodiment is of a structure in which the conductor line 22 for supplying the high frequency signal as a line that is quite separate from the signal lines 20 is provided on the same flexible printed circuit board 13.

Figure 5:
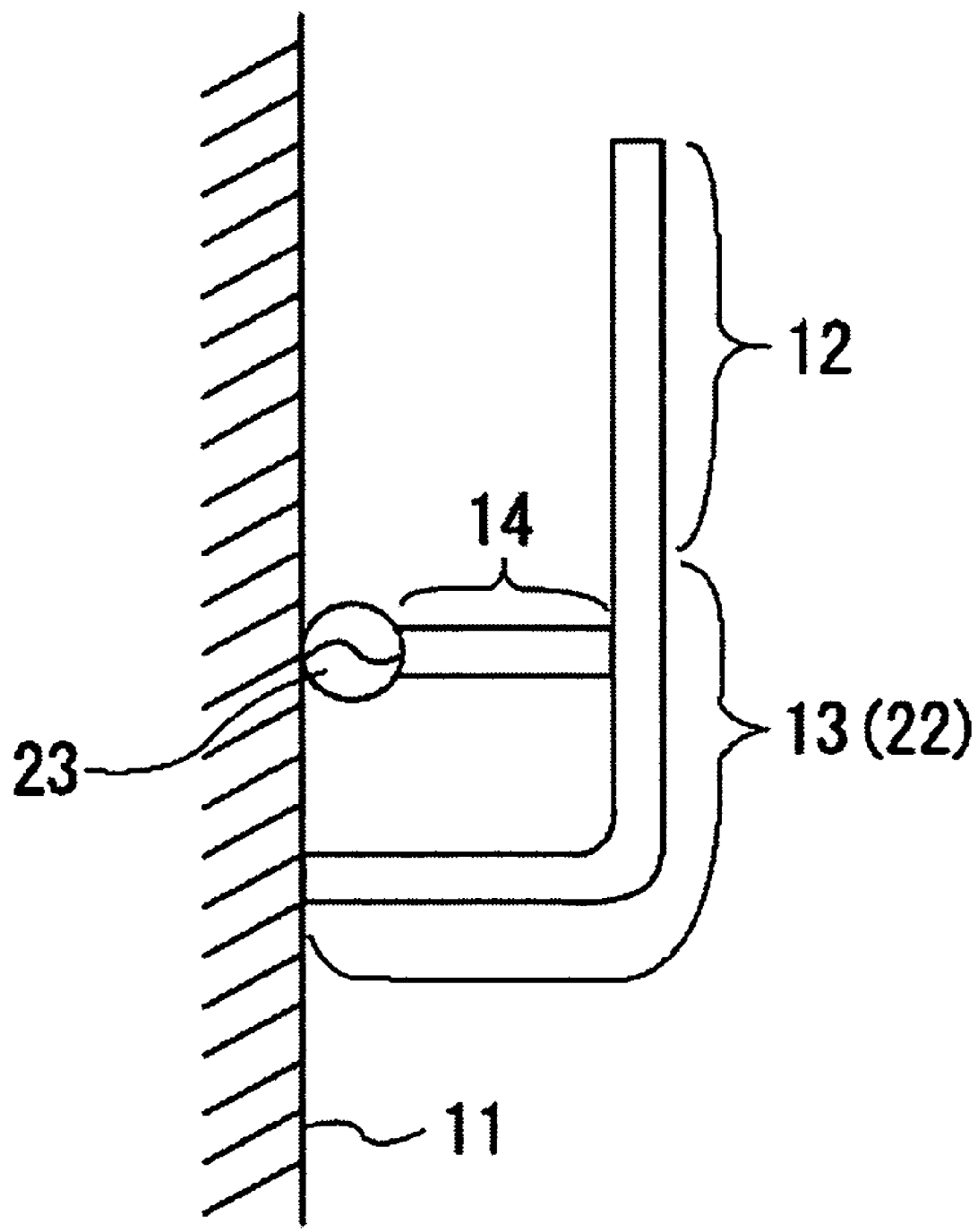
FIG. 5 is a schematic view showing that the antenna that configures the portable wireless communication apparatus of the first embodiment operates as a planar inverted-F antenna.

As shown in FIG. 5, the antenna 10 having the above configuration operates as a planar inverted-F antenna, for instance. In FIG. 5, reference numerals representing the components of the antenna 10 are applied to designate corresponding parts of the planar inverted-F antenna. In the antenna 10 of the first embodiment, the high frequency signal from the wireless circuit part 15 on the first ground conductor 11 functioning as the ground is passed through the feeder 14 via the feed point 23 to the conductor line 22 on the flexible printed circuit board 13. Then, the high frequency signal is passed through the conductor line 22 to the second ground conductor 12 via the second connector 18. Specifically, the antenna 10 of the first embodiment functions as the so-called planar inverted-F antenna in which the first ground conductor 11 operates as the ground, and the second ground conductor and a part of the conductor line 22 operate as an antenna element.

Figure 6:
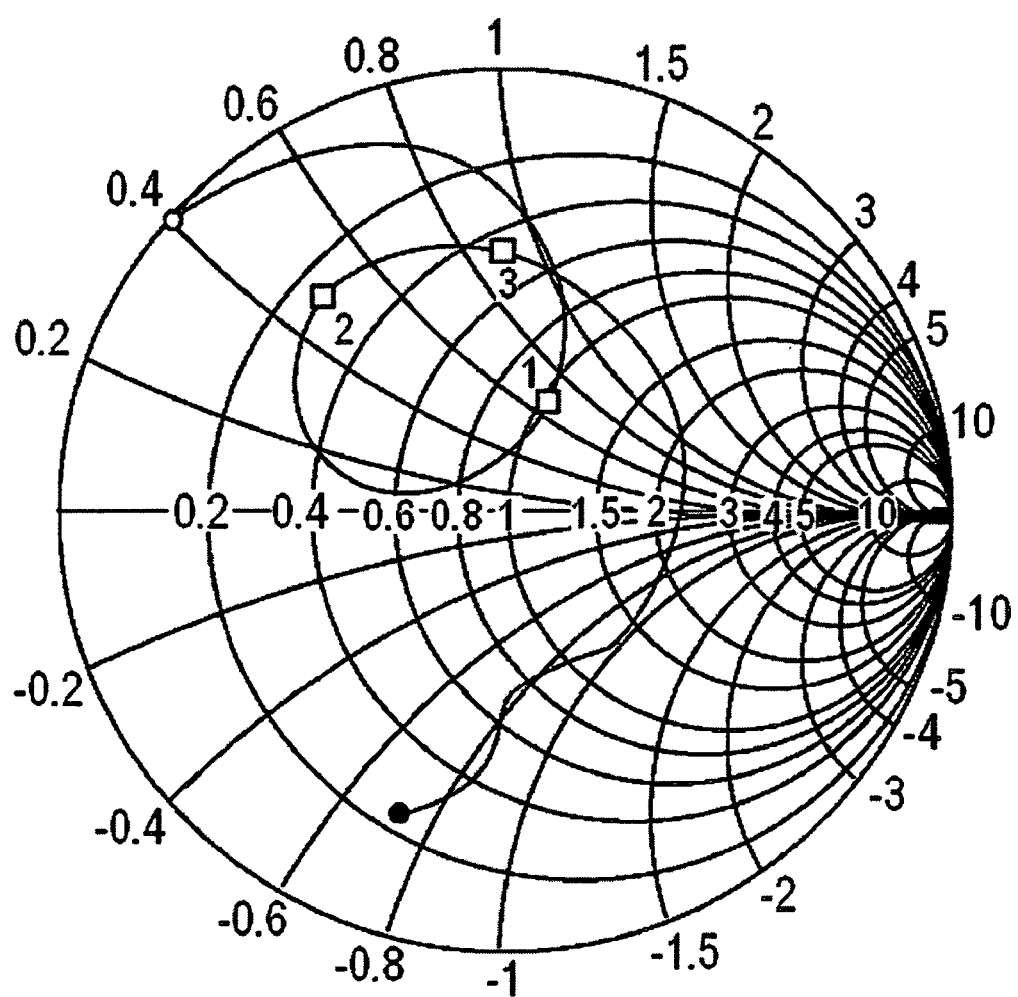
FIG. 6 illustrates a Smith chart created with reference to results of calculation obtained by electromagnetic field simulation on the antenna that configures the portable wireless communication apparatus of the first embodiment.

FIG. 6 illustrates a Smith chart created with reference to results of calculation obtained by electromagnetic field simulation on the antenna 10 of the first embodiment. In calculation, the flexible printed circuit board 13, the first ground conductor 11 and the second ground conductor 12 have been subjected to shielding in an ideal condition. Thus, calculation is performed on an assumption that the conductor is a complete conductor free from any conductor resistance. Also, frequency band targets here are in a range of 470 to 770 MHz.

Figure 7:
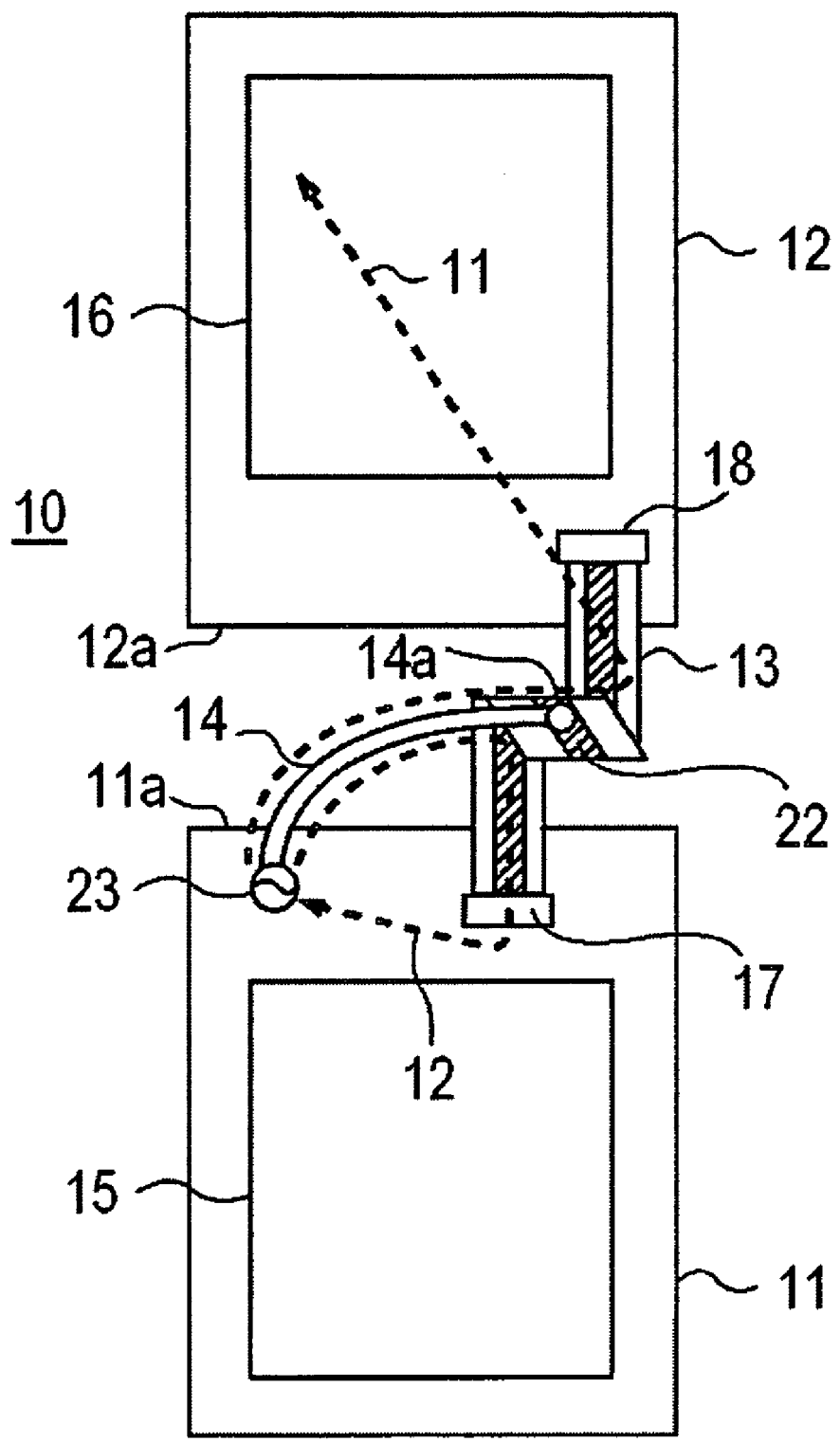
FIG. 7 is a schematic view showing electric current modes of the antenna that configures the portable wireless communication apparatus of the first embodiment.

According to the Smith chart of FIG. 6, it is understood that an α-type locus specifying a broadband antenna characteristic is clearly observed in this chart. This may be illustrated with reference to a combination of electric current modes shown in FIG. 7. In other words, as shown in FIG. 7, it is understood that the broadband antenna characteristic is attainable by a combination of a mode I1 of an electric current that flows from the feed point 23 of the antenna 10 to the second ground conductor 12 via the conductor line 22 on the flexible printed circuit board 13 with a mode I2 of an electric current that flows from the feed point 23 of the antenna 10 back to the feed point 23 through the first ground conductor 11 via the conductor line 22 on the flexible printed circuit board 13.

Figure 8:
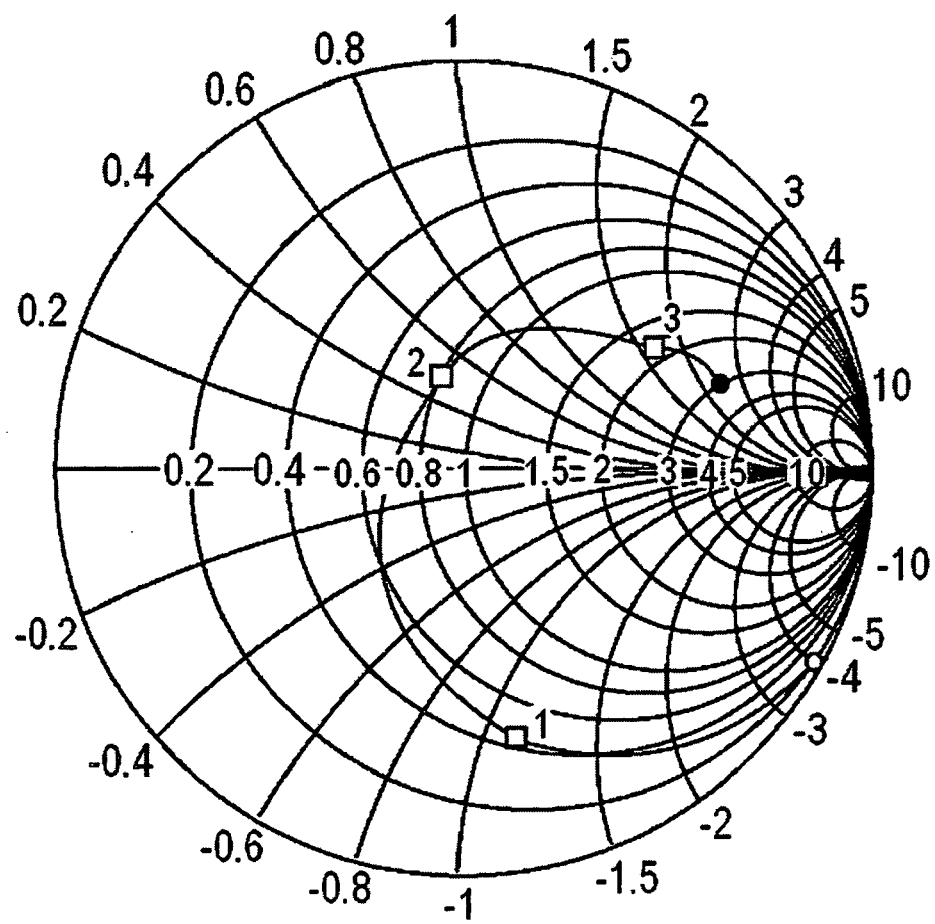
FIG. 8 illustrates a Smith chart created with reference to results of calculation obtained by electromagnetic field simulation on an antenna of a folding mobile phone cited in the Patent Document 1.

For comparison with the antenna 10 of the first embodiment, a Smith chart created with reference to results of calculation obtained by electromagnetic field simulation on the antenna of the folding mobile phone as disclosed in the above Patent Document 1 (Japanese Patent Laid-open No. 2000-216611) cited in the related arts is shown in FIG. 8. According to the Smith chart of FIG. 8, it is understood that the α-type locus is not observed and the broadband antenna characteristic is not brought to attainment, because of the presence of an impedance characteristic that is capable of being approximated with a series resonance, single resonance equivalent circuit.

The simulation on the antenna 10 of the first embodiment also provides a result that the antenna shows the broadband characteristic in characteristic impedance of 250Ω, for instance. However, when there is a need for impedance matching in a 50Ω system frequently used in a system such as a mobile phone system, optimal adjustment of a length of the flexible printed circuit board 13 or appendage of an impedance matching circuit is effective in stepping down the impedance with the broadband characteristic maintained as it is.

Figure 9:
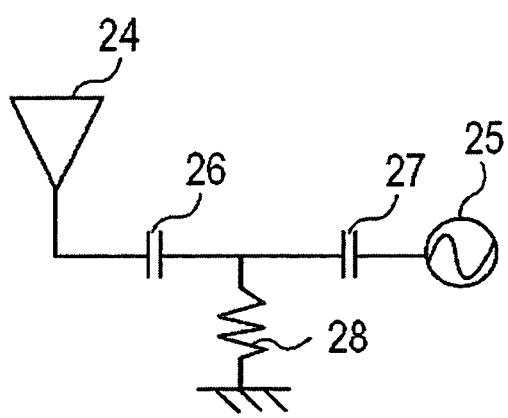
FIG. 9 is a schematic view showing a phasing unit interposed between a feed point and a feeder to enable step-down of impedance to be achieved with a broadband antenna characteristic maintained as it is for the portable wireless communication apparatus of the first embodiment.
Figure 10:
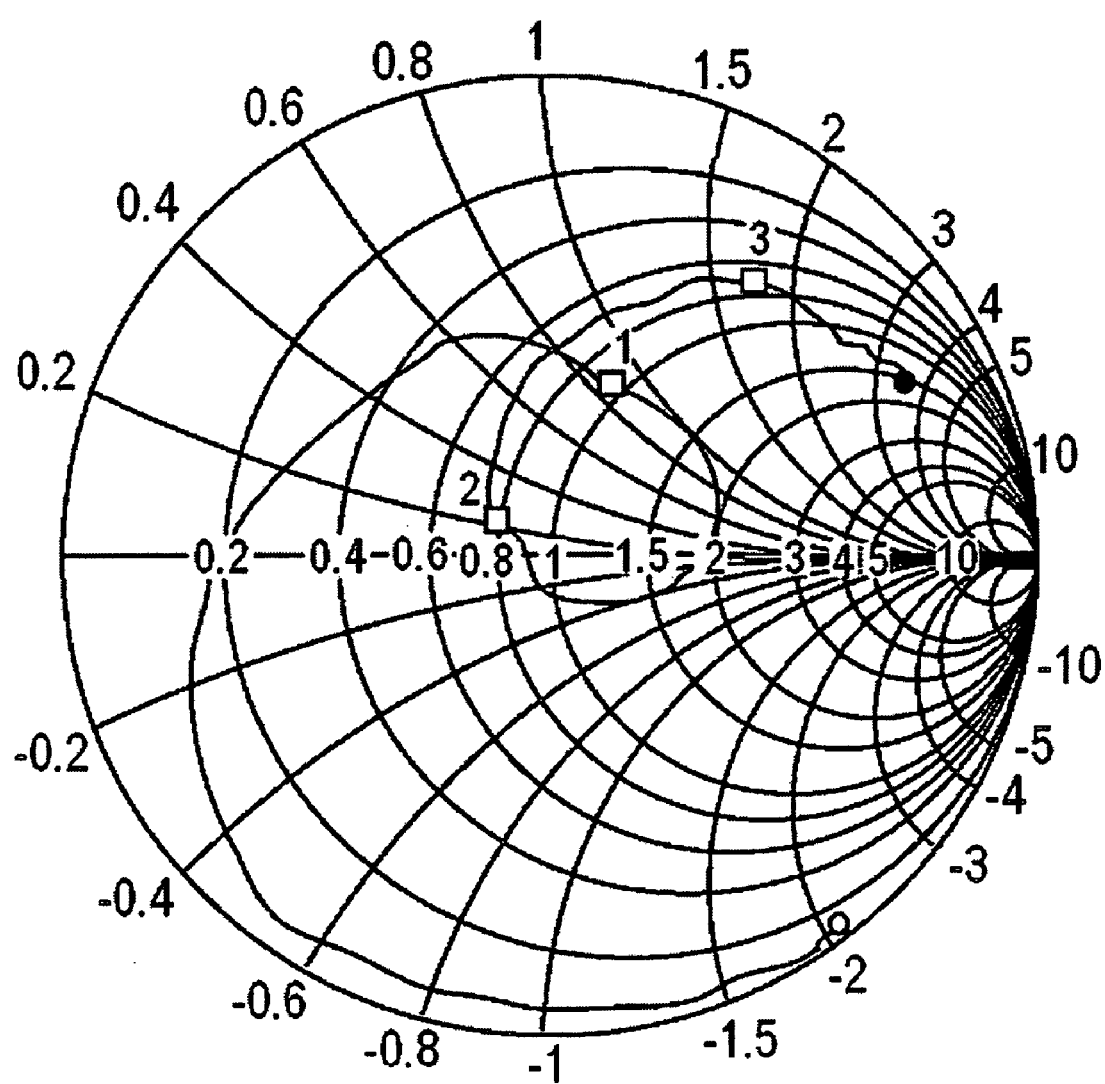
FIG. 10 illustrates a Smith chart created with reference to results of calculation obtained by electromagnetic field simulation on the antenna with the phasing unit of FIG. 9 interposed between the feed point and the feeder of the antenna of the portable wireless communication apparatus of the first embodiment.

The step-down of the impedance as described above is attainable with a T-type phasing unit configured so that a resistance 28 having one end grounded is interposed between two capacitors 26 and 27 placed in series between an antenna 24 and an AC power supply 25, for instance, as shown in FIG. 9. FIG. 10 illustrates a Smith chart created with reference to results of calculation obtained by electromagnetic field simulation with the phasing unit interposed between the feed point 23 and the feeder 14 of the antenna 10 of the first embodiment. The results of simulation confirm that impedance matching with a return loss of less than about 5 dB is attained in a bandwidth of 40% or more of a fractional bandwidth.

As described above, the portable wireless communication apparatus having the antenna 10 enables the broadband antenna characteristic to be attained with an extremely simple structure, since the conductor line 22 for supplying the high frequency signal to the second ground conductor 12 without having any effect on the signal lines 20 for electrically connecting the circuits respectively on the first ground conductor 11 and the second ground conductor 12 is configured as an integral part of the flexible printed circuit board 13 having the signal lines 20.

[Second Embodiment]

A second embodiment is that configured with direct feeding to the second ground conductor 12, instead of feeding to the conductor line 22 on the flexible printed circuit board 13. To avoid a duplicate description of the members, like reference numerals designate corresponding components of the antenna 10 of the second embodiment to those of the antenna 10 of the first embodiment.

Figure 11:
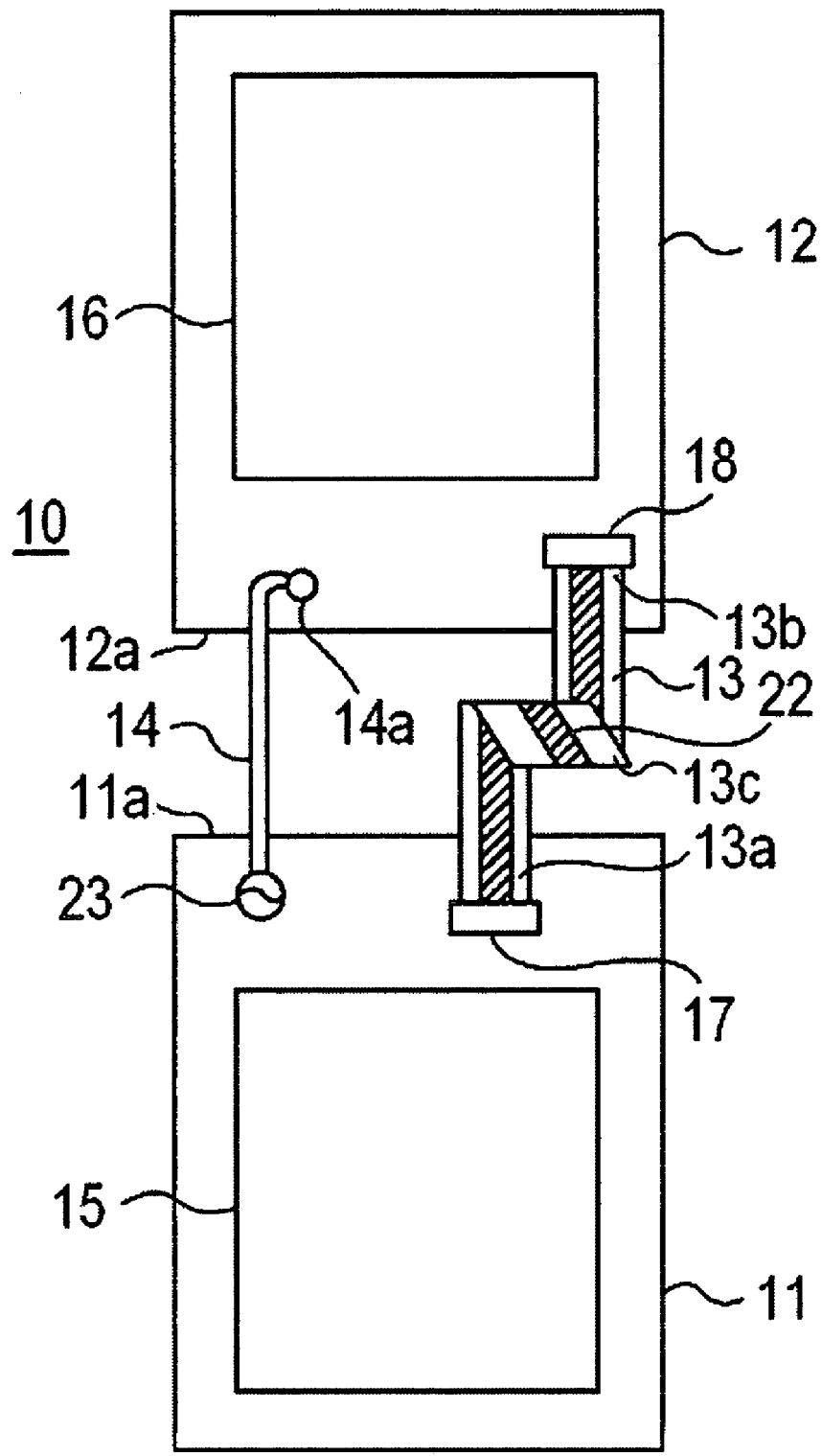
FIG. 11 is a plan view showing an antenna that configures a portable wireless communication apparatus of a second embodiment.
Figure 12:
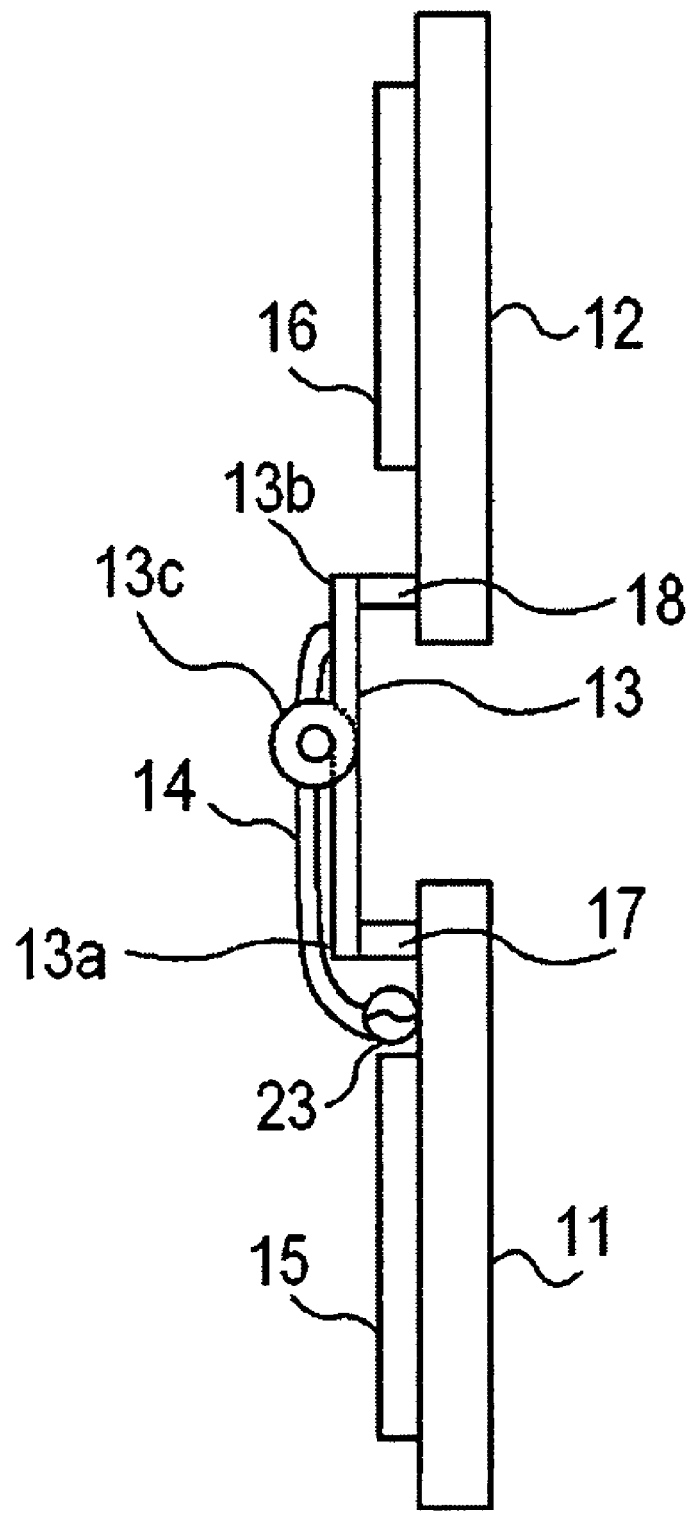
FIG. 12 is a side view showing the antenna that configures the portable wireless communication apparatus of the second embodiment.

Specifically, as shown in FIGS. 11 and 12, the antenna 10 of the second embodiment is configured so that one end 14a of the feeder 14 is grounded in such a manner as to be connected to the second ground conductor 12. The antenna 10 of the second embodiment also operates as the so-called planar inverted-F antenna similarly to the antenna 10 of the first embodiment.

Figure 13:
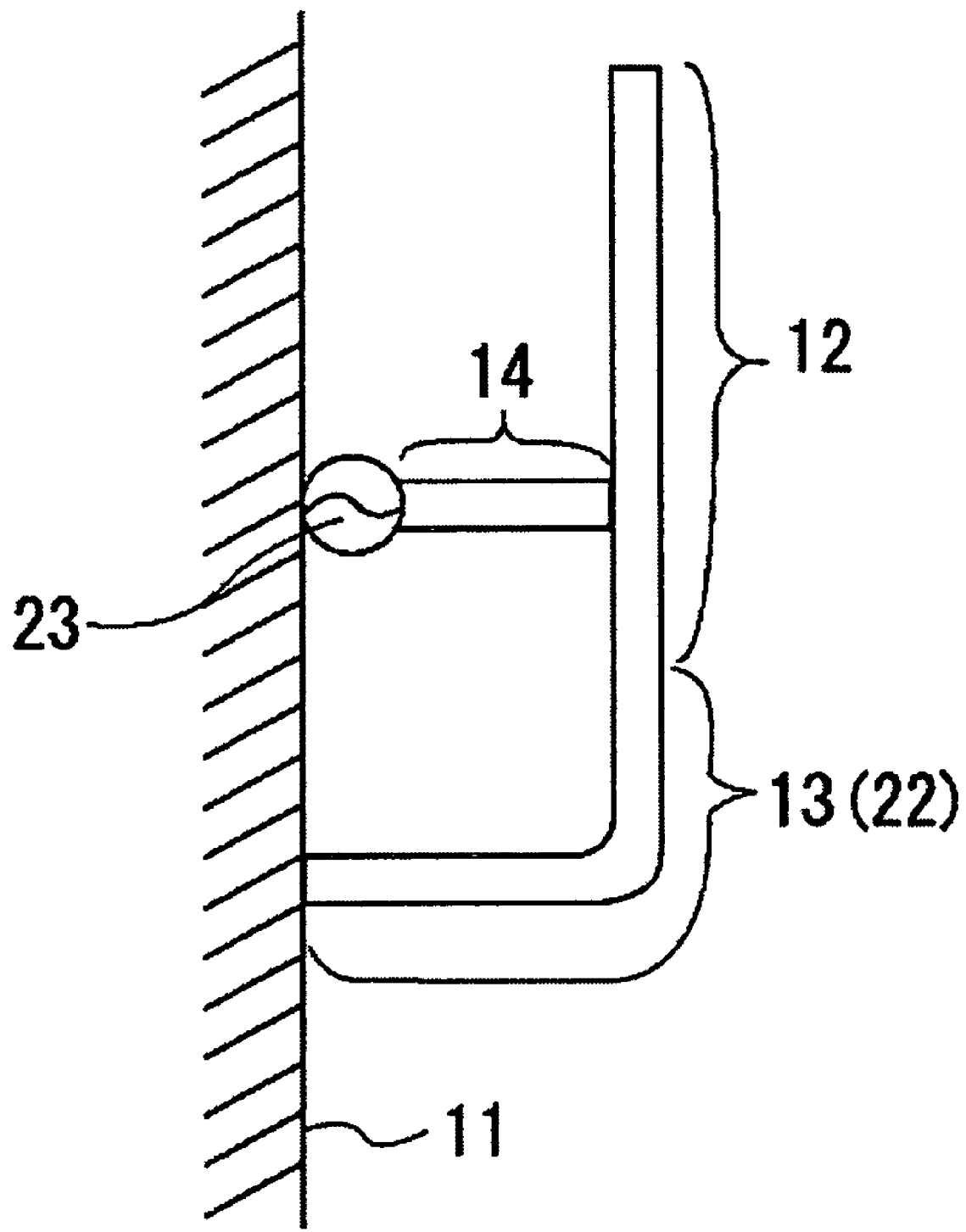
FIG. 13 is a schematic view showing that the antenna that configures the portable wireless communication apparatus of the second embodiment operates as a planar inverted-F antenna.
Figure 14:
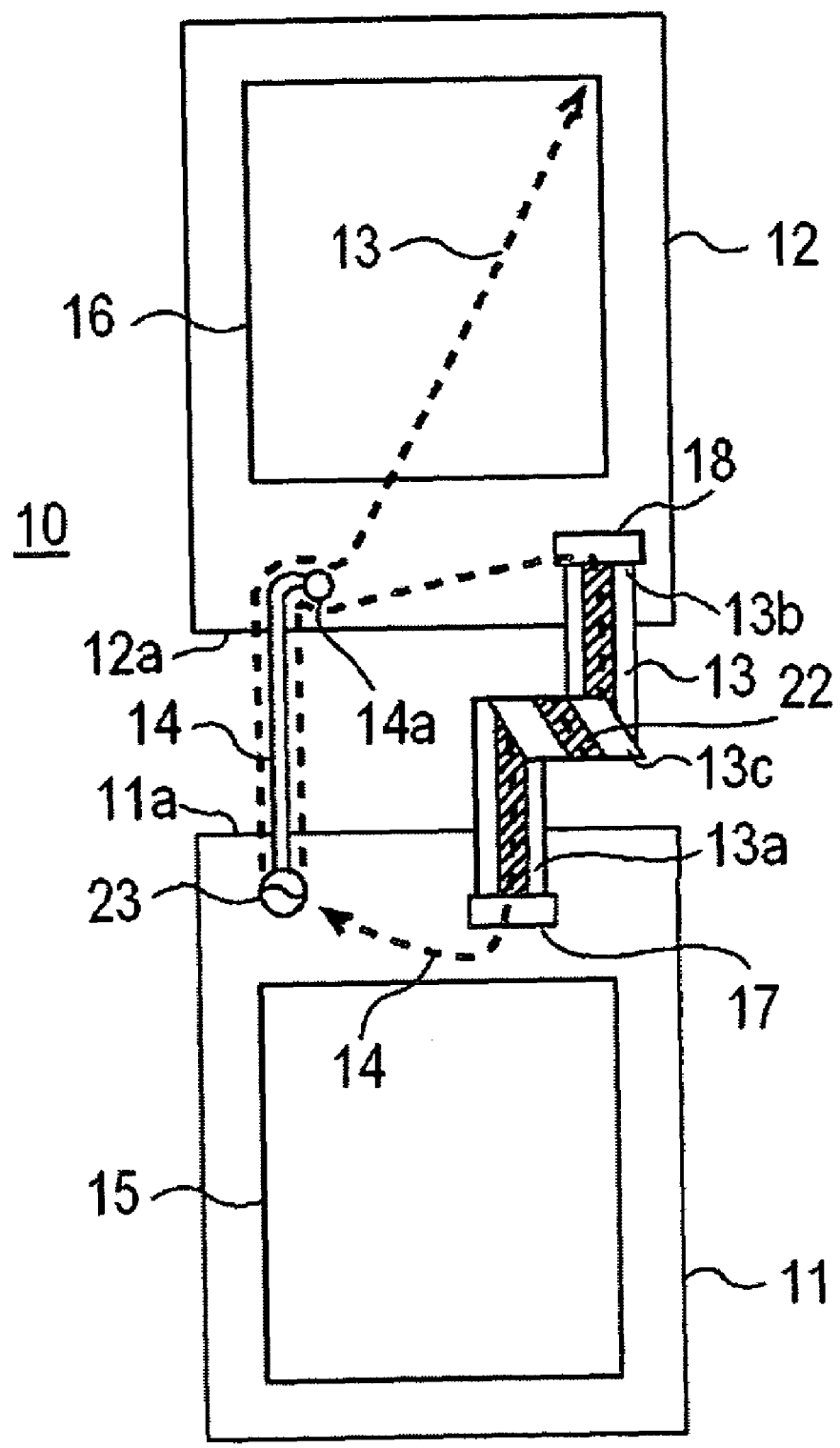
FIG. 14 is a schematic view showing electric current modes of the antenna that configures the portable wireless communication apparatus of the second embodiment.

In FIG. 13, reference numerals representing the components of the antenna 10 of the second embodiment are applied to designate corresponding parts of the planar inverted-F antenna. The antenna 10 of the second embodiment basically operates as the planar inverted-F antenna similarly to the antenna 10 of the first embodiment, with the exception of a position of the feeder 14 to be connected. The antenna 10 of the second embodiment having the configuration effective in direct feeding to the second ground conductor 12 as described above enables the broadband antenna characteristic to be attained by a combination of a mode I3 of an electric current that flows from the feed point 23 to the second ground conductor 12 via the feeder 14 with a mode I4 of an electric current that flows from the feed point 23 back to the feed point 23 through the second ground conductor 12 and the first ground conductor 11 in this order via the conductor line 22 on the flexible printed circuit board 13.

[Third Embodiment]

A third embodiment is that configured with the flexible printed circuit board 13 whose length is increased more than that of the antenna 10 of the second embodiment, and the other end 13b of the flexible printed circuit board 13 is connected to the vicinity of the other edge 12b of the second ground conductor 12 at the upper end side distant from the first ground conductor 11. To avoid a duplicate description of the members, like reference numerals designate corresponding components of the antenna 10 of the third embodiment to those of the antenna 10 of the second embodiment.

Figure 15:
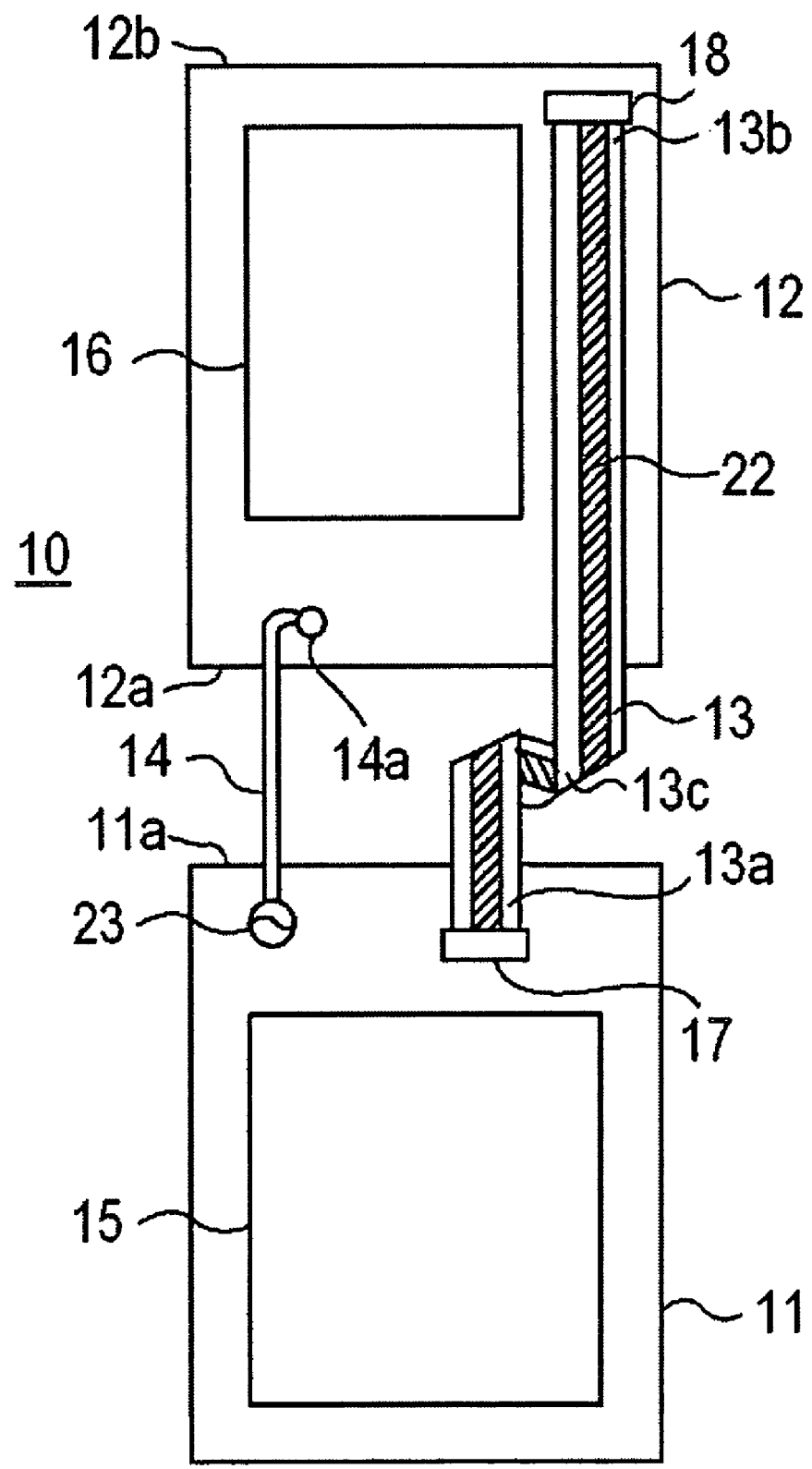
FIG. 15 is a plan view showing an antenna that configures a portable wireless communication apparatus of a third embodiment.
Figure 16:
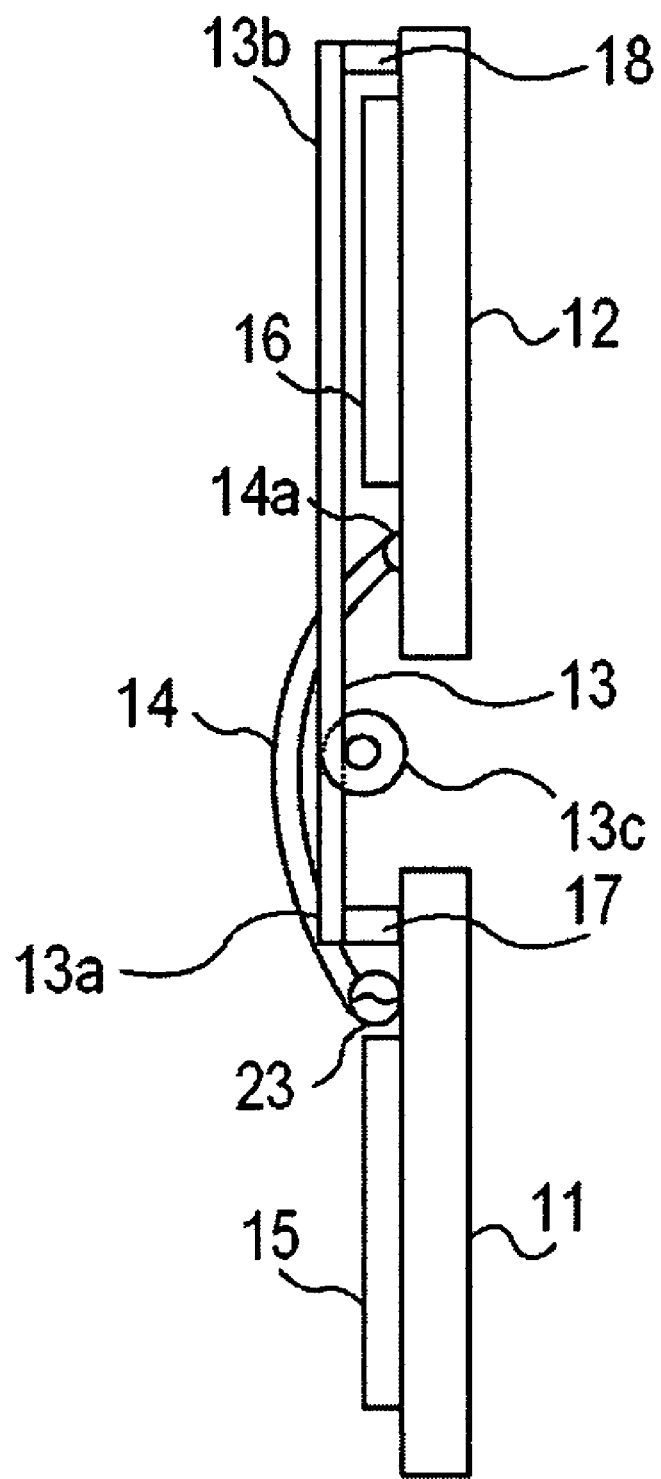
FIG. 16 is a side view showing the antenna that configures the portable wireless communication apparatus of the third embodiment.

Specifically, as shown in FIGS. 15 and 16, the flexible printed circuit board 13 allows the other end 13b connected to the second ground connector 12 to be connected to the second connector 18 mounted to the vicinity of the other edge 12b of the second ground conductor 12 at the upper end side distant from the first ground conductor 11. In the antenna 10 of the third embodiment, a point of connection of the flexible printed circuit board 13 to be connected to the second ground conductor 12 is located at a position close to the other end 12b at the upper end side distant from the first ground conductor 11 to increase the length of the flexible printed circuit board 13.

Figure 17:
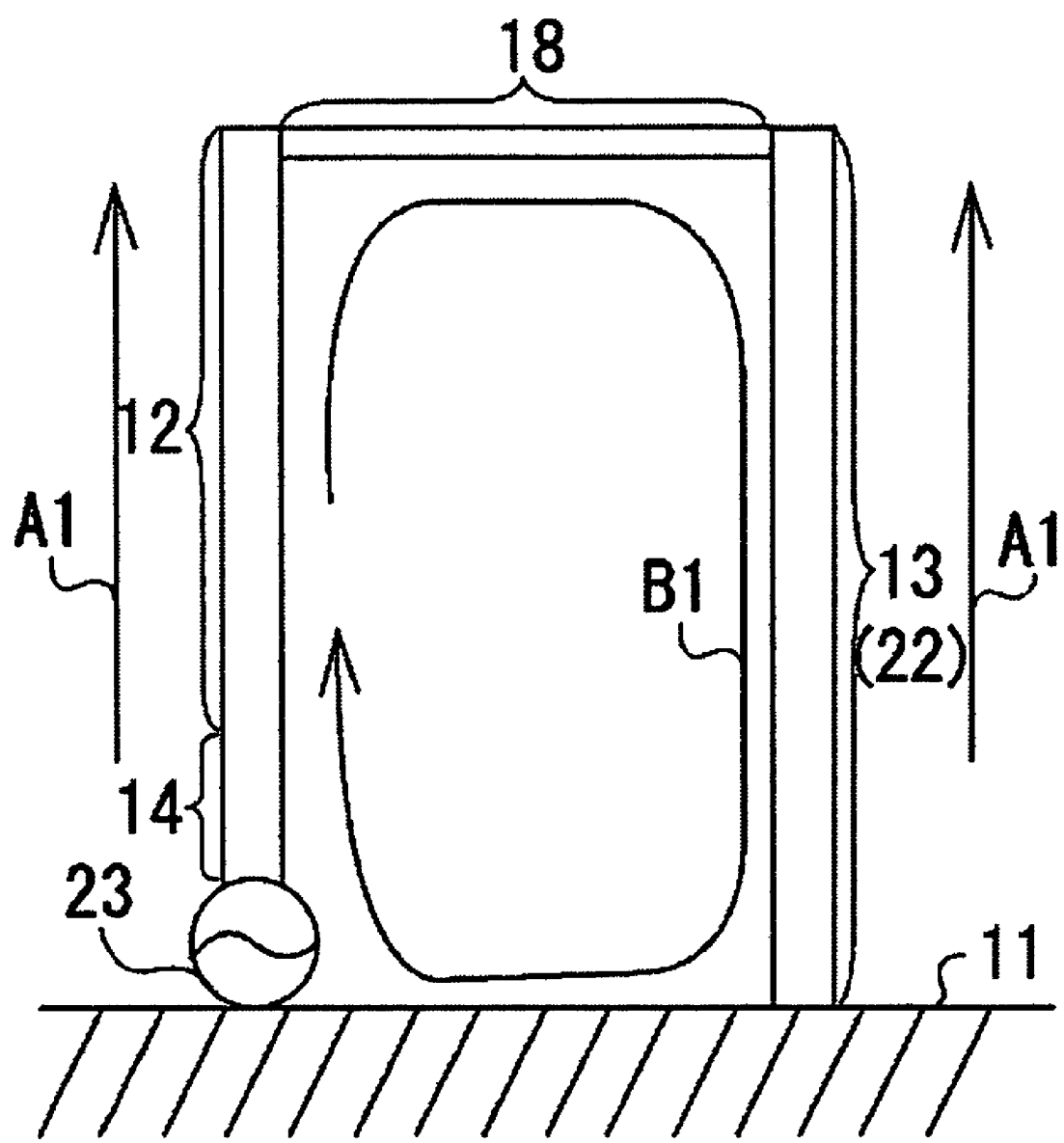
FIG. 17 is a schematic view showing that the antenna that configures the portable wireless communication apparatus of the third embodiment operates as a folded antenna.

As shown in FIG. 17, the antenna 10 of the third embodiment having the above configuration operates as a folded antenna, for instance. In FIG. 17, reference numerals representing the components of the antenna 10 are applied to designate corresponding parts of the folded antenna. The antenna 10 of the third embodiment configures the folded antenna in which the feeder 14 and the second ground conductor 12 function as one mono-pole antenna element, and the flexible printed circuit board 13 (specifically, the conductor line 22) functions as the other mono-pole antenna element, with the ends of both the elements short-circuited by the second connector 18.

With the antenna 10 of the third embodiment operating as the folded antenna, currents flowing through the element composed of the feeder 14 and the second ground conductor 12 and the element composed of the flexible printed circuit board 13 (specifically the conductor line 22) are in the same direction. Also, with the antenna 10 of the third embodiment, a radiation mode A1 generated in the element composed of the feeder 14 and the second ground conductor 12 and a radiation mode A1 generated in the element composed of the flexible printed circuit board 13 result in the same orientation, as shown in FIG. 17. The antenna 10 of the third embodiment also generates a loop mode B1 of a loop from the element composed of the feeder 14 and the second ground conductor 12 back to the feed point 23 through the flexible printed circuit board 13 via the second connector 18. Thus, the antenna 10 of the third embodiment enables the broadband antenna characteristic to be attained by a combination of the radiation mode A1 with the loop mode B1.

Figure 18:
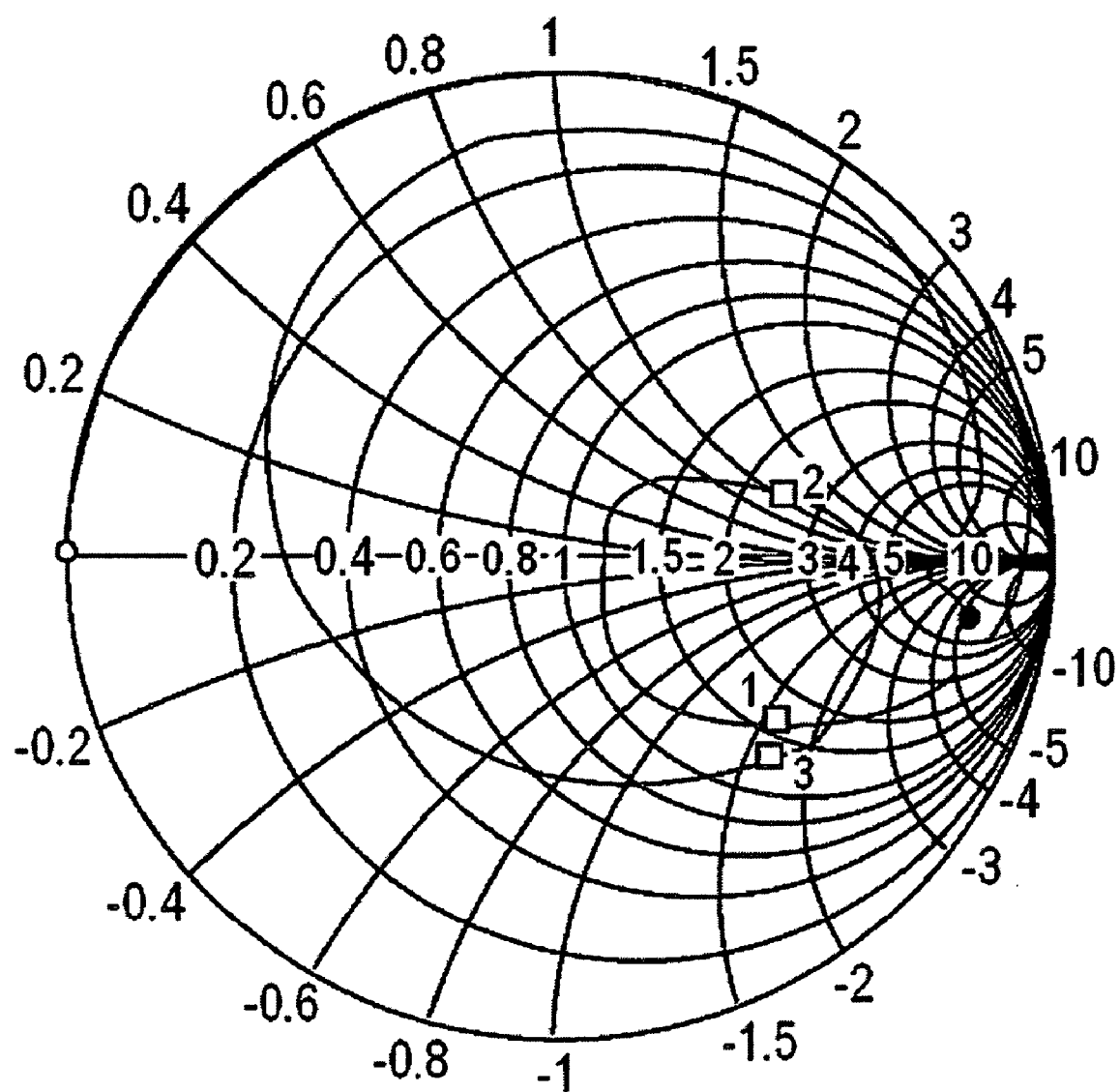
FIG. 18 illustrates a Smith chart created with reference to results of calculation obtained by electromagnetic field simulation on the antenna that configures the portable wireless communication apparatus of the third embodiment.

FIG. 18 illustrates a Smith chart created with reference to results of calculation obtained by electromagnetic field simulation on the antenna 10 of the third embodiment. In calculation, the flexible printed circuit board 13, the first ground conductor 11 and the second ground conductor 12 have been subjected to shielding in an ideal condition, similarly to the first embodiment. Thus, calculation is performed on an assumption that the conductor is a complete conductor free from any conductor resistance. Also, frequency band targets are in a range of 470 to 770 MHz, similarly to the first embodiment.

Figure 19:
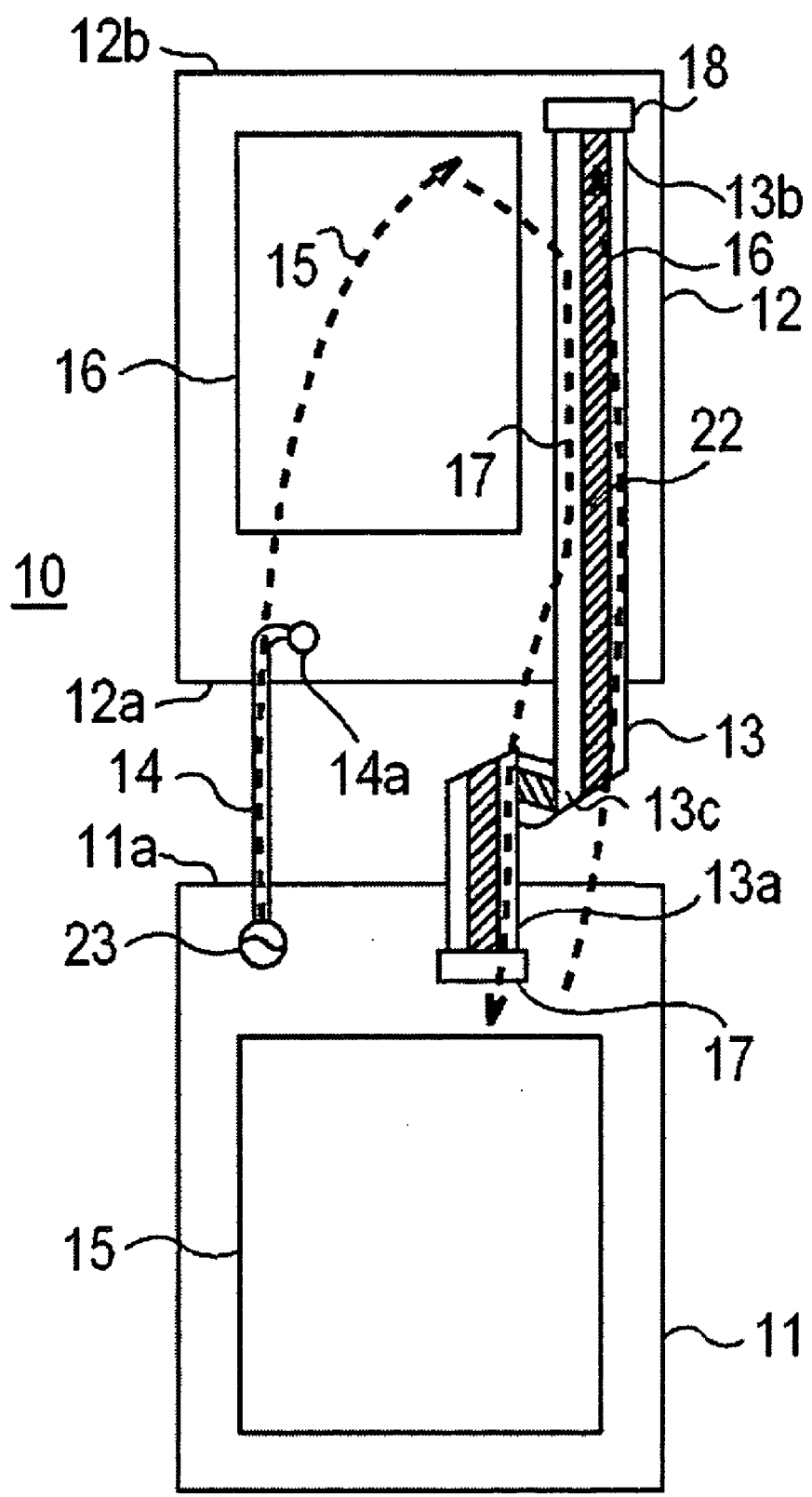
FIG. 19 is a schematic view showing electric current modes of the antenna that configures the portable wireless communication apparatus of the third embodiment.

According to the Smith chart of FIG. 18, it is understood that an α-type locus specifying the broadband antenna characteristic is attainable in the frequency band as the above targets on the Smith chart, similarly to the antenna 10 of the first embodiment. This may be illustrated with reference to a combination of electric current modes shown in FIG. 19. In FIG. 19, there is shown a state in which a mode I5 of a mono-pole antenna electric current that flows from the feed point 23 to the second ground conductor 12 via the feeder 14, a mode I6 of a mono-pole antenna in-phase electric current that flows through the flexible printed circuit board 13 from the first ground conductor 11 and a mode I7 of a mono-pole antenna opposite-phase electric current that flows from the flexible printed circuit board 13 to the first ground conductor 11 are generated.

Thus, the antenna 10 of the third embodiment enables the broadband antenna characteristic to be attained, because of the presence of the in-phase electric current modes I5 and I6 and the opposite-phase electric current mode I7 of the current flowing through the respective elements. In addition, the antenna 10 of the third embodiment also enables step-up of the impedance to be attained. For instance, the antenna 10 of the third embodiment may adjust the characteristic impedance by properly varying a distance between the two facing elements (mainly the second ground conductor 12 and the flexible printed circuit board 13) and a lateral width ratio of the element, so that the impedance characteristic is adjustable. Thus, according to the present invention, the antenna 10 suited to the available bandwidth for the portable wireless communication apparatus may be simply created.

[Fourth Embodiment]

A fourth embodiment is that configured with the flexible printed circuit board 13 whose length is reduced to the approximately half of that of the antenna 10 of the third embodiment, and the other end 13b of the flexible printed circuit board is connected to the second connector 18 mounted at a substantially intermediate position of the second ground conductor 12. In the antenna 10 of the fourth embodiment, an additional flexible printed circuit board provided separately from the flexible printed circuit board 13 is connected to the above second connector 18. To avoid a duplicate description of the members, like reference numerals designate corresponding components of the antenna 10 of the fourth embodiment to those of the antenna 10 of the third embodiment.

Figure 20:
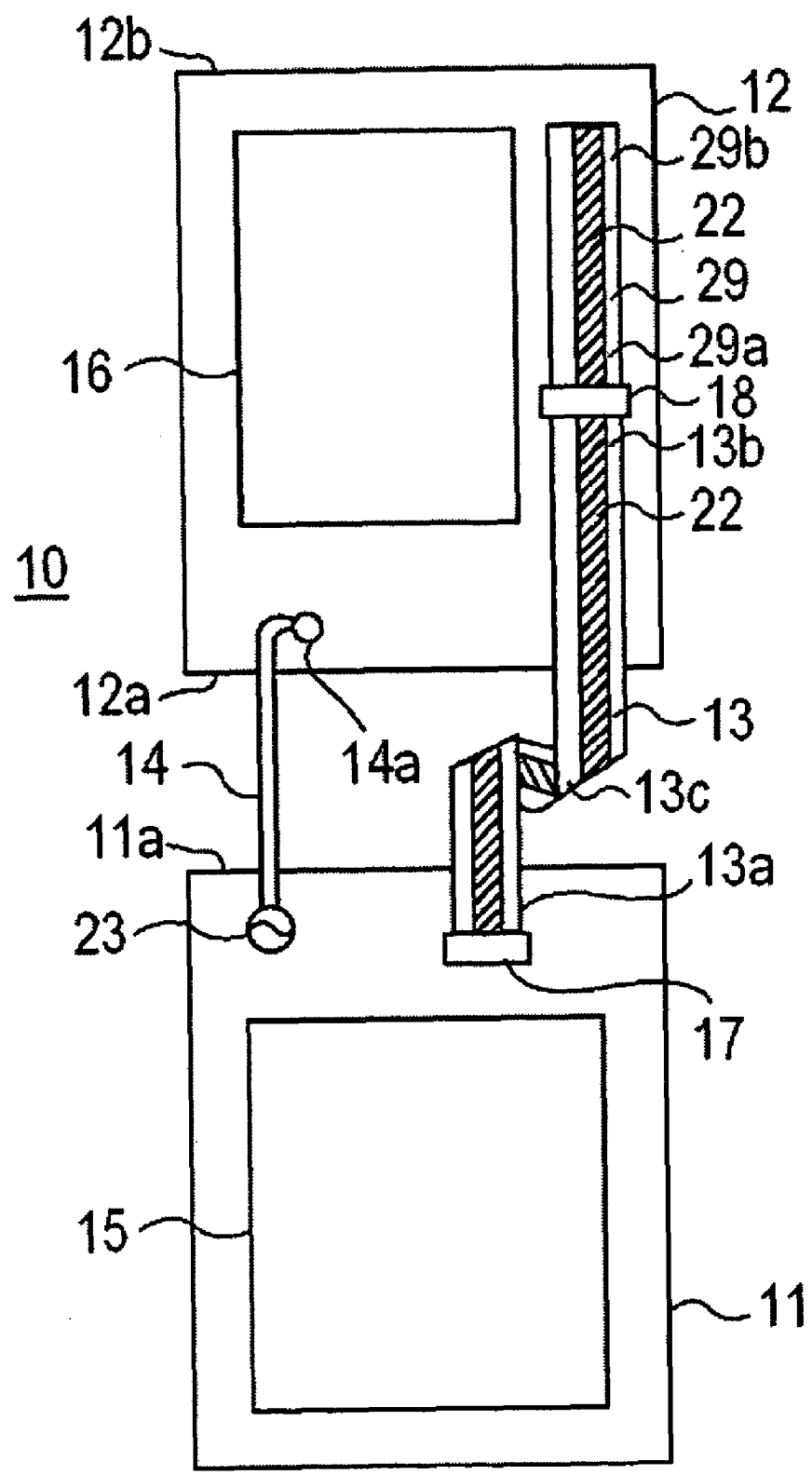
FIG. 20 is a plan view showing an antenna that configures a portable wireless communication apparatus of a fourth embodiment.
Figure 21:
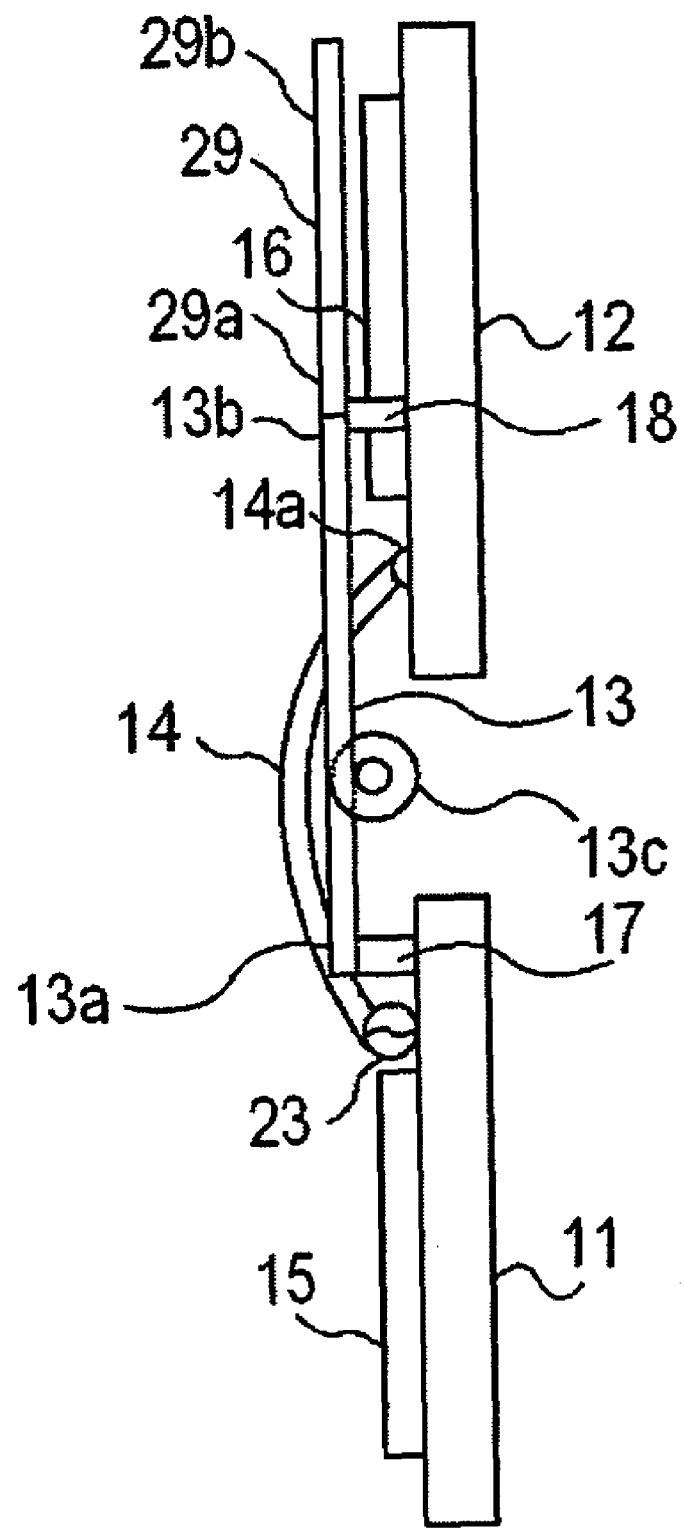
FIG. 21 is a side view showing the antenna that configures the portable wireless communication apparatus of the fourth embodiment.

Specifically, as shown in FIGS. 20 and 21, the antenna 10 of the fourth embodiment allows the other end 13b of the flexible printed circuit board 13 for connecting the first ground conductor 11 and the second ground conductor 12 together to be connected to the second connector 18 mounted at a substantially longitudinal central position of the second ground conductor 12. An additional second flexible printed circuit board 29 provided separately from the flexible printed circuit board 13 is connected to the second connector 18. The second flexible printed circuit board 29 is obtained by integrating the signal lines 20 with the conductor line 22 through the insulator 21, similarly to the flexible printed circuit board 13. The second flexible printed circuit board 29 allows only one end 29a thereof to be connected to the second connector 18, with the other end 29b being not connected to the second ground conductor 12.

The second flexible printed circuit board 29 and the flexible printed circuit board 13 respectively have the conductor lines 22 connected together through the second connector 18. The second flexible printed circuit board 29 is used only as a part of the antenna 10, and therefore, may be of a structure having only the conductor line 22 on the insulator 21 without providing any signal lines 20.

Figure 22:
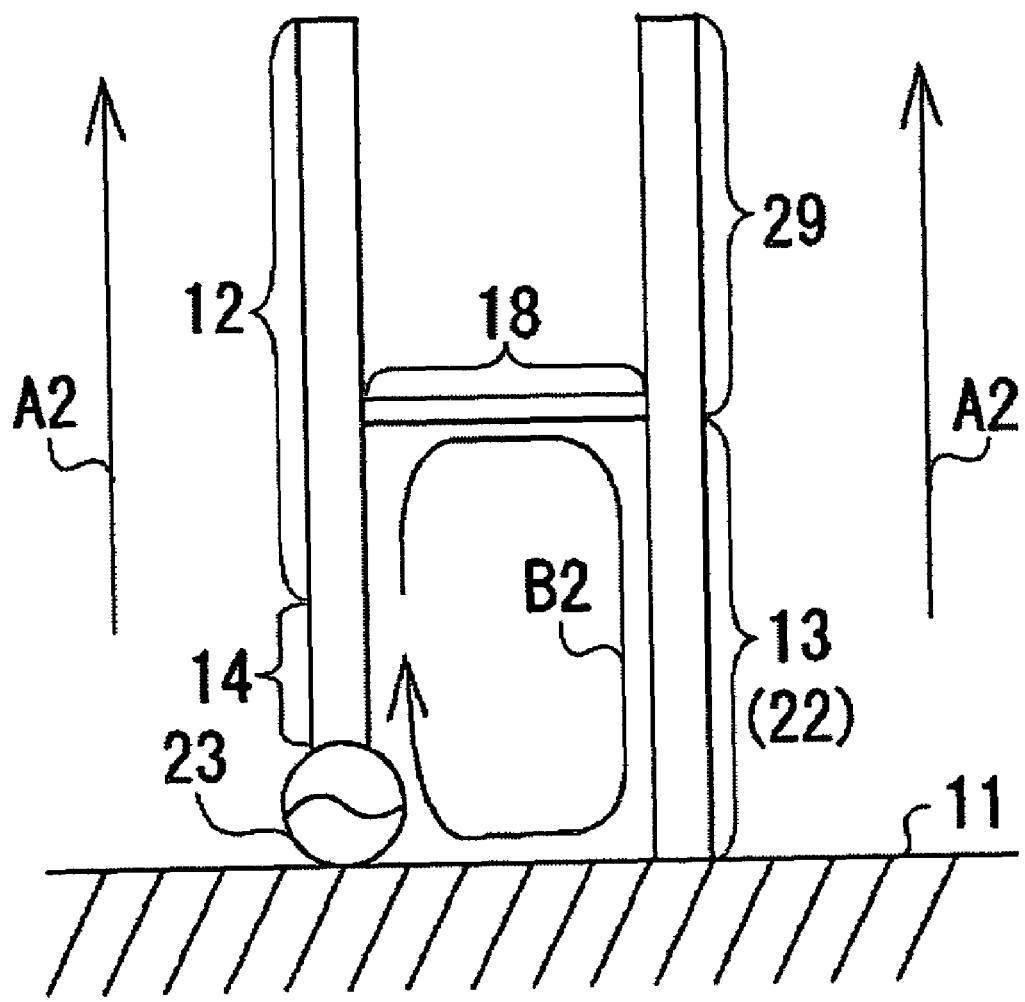
FIG. 22 is a schematic view showing that the antenna that configures the portable wireless communication apparatus of the fourth embodiment operates as a folded antenna.

As shown in FIG. 22, the antenna 10 of the fourth embodiment having the above configuration operates as the so-called folded antenna. In FIG. 22, reference numerals representing the components of the antenna 10 are applied to designate corresponding parts of the folded antenna. The antenna 10 of the fourth embodiment is considered to be of a structure in which the tip ends of both the elements of the antenna 10 of the third embodiment are further provided with the elements to increase the length of the whole antenna element. Specifically, the antenna 10 of the fourth embodiment configures the so-called folded antenna in which the feeder 14 and the second ground conductor 12 function as one mono-pole antenna element, and the flexible printed circuit board 13 and the second flexible printed circuit board 29 provided as extending therefrom (specifically, the conductor line 22) function as the other mono-pole antenna element, with these elements short-circuited midway by the second connector 18.

With the antenna 10 of the fourth embodiment, currents flowing through the element composed of the feeder 14 and the second ground conductor 12 and the element composed of the flexible printed circuit board 13 and the second flexible printed circuit board 29 extending therefrom are in the same direction, similarly to the antenna 10 of the third embodiment. Also, with the antenna 10 of the fourth embodiment, a radiation mode A2 generated in the element composed of the feeder 14 and the second ground conductor 12 and a radiation mode A2 generated in the element composed of the flexible printed circuit board 13 and the second flexible printed circuit board 29 extending therefrom result in the same orientation, as shown in FIG. 22. The antenna 10 of the fourth embodiment also generates a loop mode B2 of a loop from the element composed of the feeder 14 and the second ground conductor 12 back to the feed point 23 through the flexible printed circuit board 13 via the second connector 18. The antenna 10 of the fourth embodiment enables the broadband antenna characteristic to be attained by a combination of the radiation mode A2 with the loop mode B2, similarly to the antenna 10 of the third embodiment.

Figure 23:
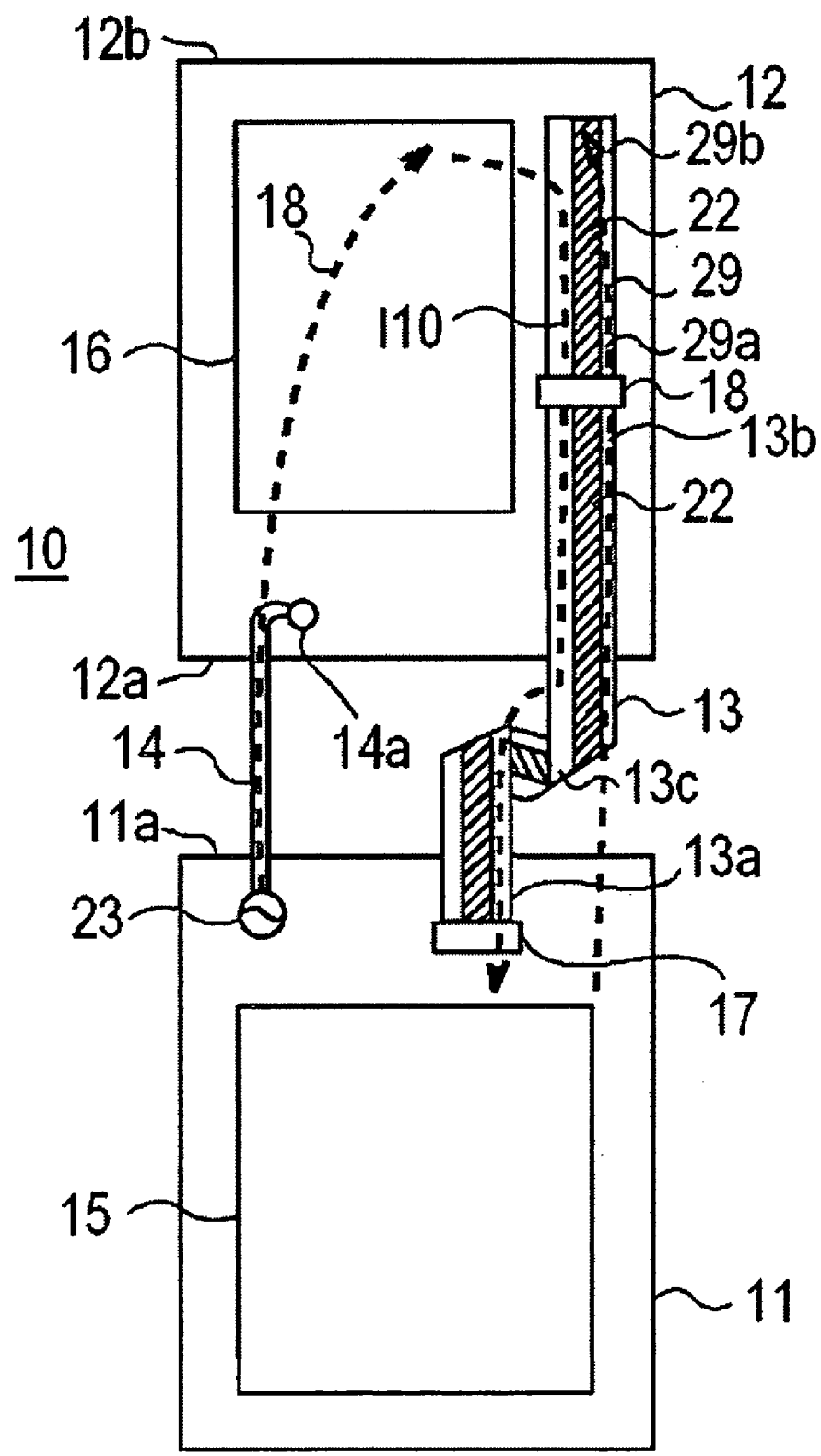
FIG. 23 is a schematic view showing current modes of the antenna that configures the portable wireless communication apparatus of the fourth embodiment.

The antenna 10 of the fourth embodiment also generates electric current modes as shown in FIG. 23, similarly to the antenna 10 of the third embodiment. Specifically, the antenna 10 of the fourth embodiment generates a mode I8 of a mono-pole antenna electric current that flows from the feed point 23 to the second ground conductor 12 via the feeder 14, a mode I9 of a mono-pole antenna in-phase electric current that flows through the flexible printed circuit board 13 and the second flexible printed circuit board 29 connected thereto from the first ground conductor 11 and a mode I10 of a mono-pole antenna opposite-phase electric current that flows from the second flexible printed circuit board 29 and the flexible printed circuit board 13 connected thereto to the first ground conductor 11.

Thus, the antenna 10 of the fourth embodiment enables the broadband antenna characteristic to be attained, together with the step-up of the impedance, because of the presence of the in-phase current modes I8 and I9 and the opposite-phase current mode I10 of the currents respectively flowing through the elements, similarly to the antenna 10 of the third embodiment. According to the antenna 10 of the fourth embodiment, adjustment of the length of the second flexible printed circuit board 29 connected to the second connector 18 makes it possible to finely adjust the antenna characteristic to be suited to the available bandwidth for the portable wireless communication apparatus.

Judging the antenna 10 of the fourth embodiment from a different point of view, the impedance characteristic is made adjustable in such a way as to vary the length of a path of opposite-phase current out of currents flowing through two elements (mainly composed of the second ground conductor 12, the flexible printed circuit board 13 and the second flexible printed circuit board 29 connected thereto) by varying a position where short-circuiting between the two elements is effected.

[Fifth Embodiment]

A fifth embodiment is configured with the first ground conductor 11 and the second ground conductor 12 that are placed to be long sideways, instead of those placed to be long lengthways like the antenna 10 of the first embodiment. To avoid a duplicate description of the members, like reference numerals designate corresponding components of the antenna 10 of the fifth embodiment to those of the antenna 10 of the first embodiment.

Figure 24:
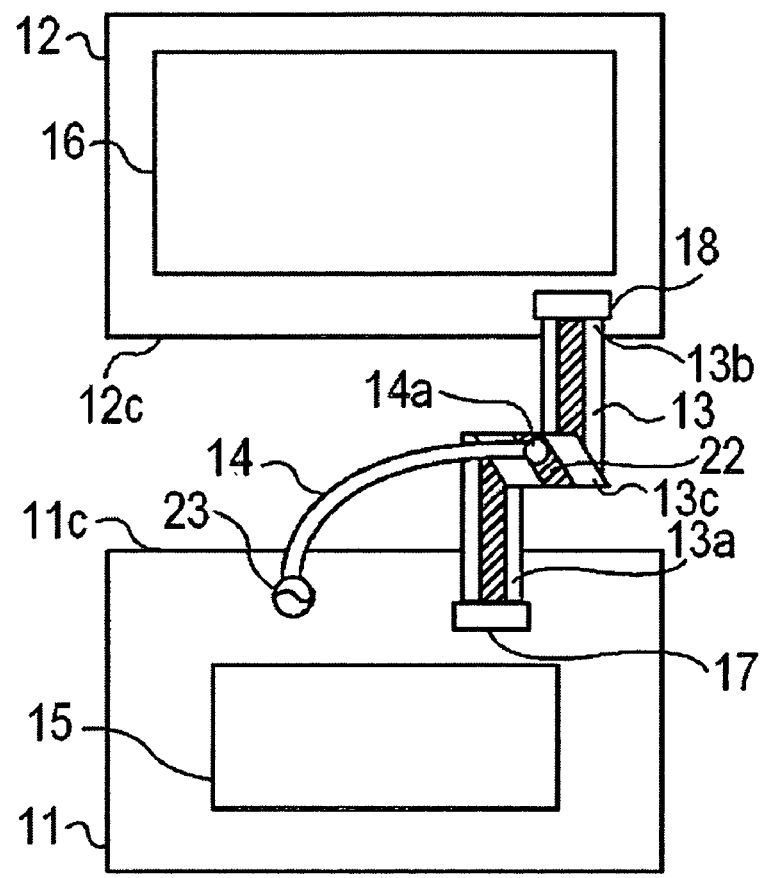
FIG. 24 is a plan view showing an antenna that configures a portable wireless communication apparatus of a fifth embodiment.
Figure 25:
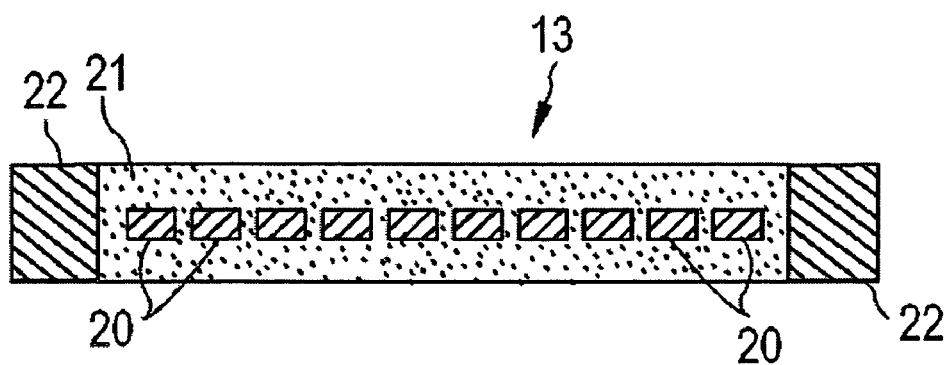
FIG. 25 is a fragmentary enlarged cross-sectional view showing a flexible printed circuit board having wide conductor lines respectively at the opposite edges in a longitudinal direction thereof according to another embodiment of the flexible printed circuit board.

Specifically, as shown in FIG. 24, the antenna 10 of the fifth embodiment is configured so that the first ground conductor 11 and the second ground conductor 12 are placed to be side by side (in a horizontal direction), and the flexible printed circuit board 13 is connected to the vicinity of one longitudinal edge 11c of the first ground conductor 11 and of the confronting one longitudinal edge 12c of the second ground conductor 12.

The antenna 10 of the fifth embodiment is by no means limited to application to the mobile phone, for instance, and may be suitably applied to a mobile terminal apparatus such as a notebook-sized personal computer, a handheld personal computer or a Personal Digital Assistant (PDA) having a communication function.

[Other Embodiments]

Although the specific embodiments with the present invention applied have been described heretofore, the present invention is not restrictive to the above embodiments, and various changes and modifications may be made.

The present invention is by no means limited to the flexible printed circuit board 13 obtained by integrating the signal lines 20 with the conductor line 22 in such a way as to layer the conductor 22 on each of the upper and lower faces 21a and 21b of the insulator 21 with the signal lines 20 between as described in the above first to fifth embodiments. Alternatively, the flexible printed circuit board 13 may be a flexible printed circuit board having a wide conductor line 22 at each of the opposite edges in a longitudinal direction thereof.

The flexible printed circuit board 13 having the widthwise conductor lines 22 in the longitudinal direction of the cable as described above has the advantage of being obtained only by simply fabricating the existing flexible printed circuit board after assembly thereof.

Also, the present invention is by no means limited to connection of the other end 13b of the flexible printed circuit board 13 to the vicinity of the other edge 12b of the upper end side of the second ground conductor 12 as described in the third embodiment. Alternatively, the other end 13b of the flexible printed circuit board 13 may be connected to an optional position between one edge 12a and the other edge 12b of the second ground conductor 12 to permit fine adjustment of the antenna characteristic according to the available bandwidth.

As described above, according to the present invention, it is possible to provide the portable wireless communication apparatus having the broadband antenna characteristic with the simple structure, irrespectively of the packaging conditions of the circuit substrates and/or the components.

What is claimed is:

1. A portable wireless communication apparatus comprising:
    an antenna composed of:
        a first ground conductor;
        a second ground conductor;
        connection means that is substantially flat having both a conductor line for supplying a high frequency signal to either one of said first ground conductor and said second ground conductor and signal lines for electrically connecting prescribed circuits respectively on said first ground conductor and said second ground conductor to electrically connect said first ground conductor and said second ground conductor together; and
        a feeder having one end connected to a part of said connection means and the other end connected to a feed point mounted to either one of said first ground conductor and said second ground conductor to effect feeding thereto.

2. The portable wireless communication apparatus according to claim 1, wherein said connection means is a flexible printed circuit board.

3. The portable wireless communication apparatus according to claim 2, wherein said conductor line is in a form of a plated layer.

4. The portable wireless communication apparatus according to claim 2, wherein said conductor line is layered at least on a surface of said flexible printed circuit board in a thickness direction thereof.

5. The portable wireless communication apparatus according to claim 2, wherein said conductor line is provided at least along an edge of said flexible printed circuit board in a longitudinal direction thereof.

6. The portable wireless communication apparatus according to claim 2, wherein the opposite connection ends of said flexible printed circuit board are respectively connected to the vicinity of one edge of said first ground conductor and of the confronting one edge of said second ground conductor.

7. The portable wireless communication apparatus according to claim 1, further comprising
    a first casing; and
    a second casing connected to said first casing through a hinge part in a freely foldable manner;
    wherein said first casing incorporates said first ground conductor; said second casing incorporates said second ground conductor; and said hinge part incorporates at least a part of said connection means.

8. A portable wireless communication apparatus comprising:
an antenna composed of:
a first ground conductor;
a second ground conductor;
connection means that is substantially flat having both a conductor line for supplying a high frequency signal to either one of said first ground conductor and said second ground conductor and signal lines for electrically connecting circuits respectively on said first ground conductor and said second ground conductor to electrically connect said first ground conductor and said second ground conductor together; and
a feeder having one end connected to a part of either one of said first ground conductor and said second ground conductor and the other end connected to a feed point mounted to the other ground conductor to effect feeding thereto.

9. The portable wireless communication apparatus according to claim 8, wherein said connection means is a flexible printed circuit board.

10. The portable wireless communication apparatus according to claim 9, wherein said conductor line is in a form of a plated layer.

11. The portable wireless communication apparatus according to claim 9, wherein said conductor line is layered at least on a surface of said flexible printed circuit board in a thickness direction thereof.

12. The portable wireless communication apparatus according to claim 9, wherein said conductor line is provided at least along an edge of said flexible printed circuit board in a longitudinal direction thereof.

13. The portable wireless communication apparatus according to claim 9, wherein the opposite connection ends of said flexible printed circuit board are respectively connected to the vicinity of one edge of said first ground conductor and of the confronting one edge of said second ground conductor.

14. The portable wireless communication apparatus according to claim 9, wherein one end of said flexible printed circuit board is connected to the vicinity of one edge of the ground conductor having the feed point from out of one edge of said first ground conductor and the confronting one edge of said second ground conductor, with the other end of said flexible printed circuit board being connected to the vicinity of the other edge at the side opposite to said one edge of the ground conductor to which feeding is effected.

15. The portable wireless communication apparatus according to claim 9, wherein one end of said flexible printed circuit board is connected to the vicinity of one edge of the ground conductor having the feed point from out of one edge of said first ground conductor and the confronting one edge of said second ground conductor, with the other end of said flexible printed circuit board being connected to an intermediate part between said one edge of the ground conductor to which feeding is effected and the other edge at the side opposite to said one edge.

16. The portable wireless communication apparatus according to claim 15, wherein an additional flexible printed circuit board electrically connected to said flexible printed circuit board is provided to extend from said intermediate part to said other edge.

17. The portable wireless communication apparatus according to claim 8, further comprising
a first casing; and
a second casing connected to said first casing through a hinge part in a freely foldable manner,
wherein: said first casing incorporates said first ground conductor; said second casing incorporates said second ground conductor; and said hinge part incorporates at least a part of said connection means.

18. The apparatus of claim 2, wherein the conductor line is formed on both a top surface and a bottom surface of the flexible printed circuit board.

19. The apparatus of claim 2, wherein the conductor line is formed on both longitudinal edges of the flexible printed circuit board.

* * * * *